United States Patent [19]
Inaniwa et al.

[11] Patent Number: 5,731,681
[45] Date of Patent: Mar. 24, 1998

[54] MOTOR CONTROL SYSTEM FOR CENTRIFUGAL MACHINE

[75] Inventors: Masahiro Inaniwa; Nobuharu Kido; Takahiro Fujimaki; Shinji Watanabe; Noriyasu Matsufuji; Yoshinori Tobita, all of Hitachinaka, Japan

[73] Assignee: Hitachi Koki Co., Ltd., Tokyo, Japan

[21] Appl. No.: 800,902

[22] Filed: Feb. 12, 1997

Related U.S. Application Data

[63] Continuation of Ser. No. 495,962, Jun. 28, 1995, Pat. No. 5,608,301.

[51] Int. Cl.$^6$ .................................................. H02M 7/539
[52] U.S. Cl. .......................... 318/729; 318/376; 318/448; 318/759; 363/34; 363/39
[58] Field of Search .......................... 318/268–271, 318/375, 376, 438, 448, 702, 729, 759, 799–803, 807, 810–812; 363/34, 37, 39–41, 44–48

[56] References Cited

U.S. PATENT DOCUMENTS

| | | |
|---|---|---|
| 4,354,223 | 10/1982 | Turnbull .................. 318/811 X |
| 4,672,303 | 6/1987 | Newton . |
| 4,750,102 | 6/1988 | Yamano et al. . |
| 4,879,639 | 11/1989 | Tsukahara . |
| 5,235,504 | 8/1993 | Sood . |

FOREIGN PATENT DOCUMENTS

| | | |
|---|---|---|
| 0 013 615 | 7/1980 | European Pat. Off. . |
| 56-415195 | 9/1981 | Japan . |
| 4054873 | 2/1992 | Japan . |
| 2 222 328 | 2/1990 | United Kingdom . |

*Primary Examiner*—Bentsu Ro
*Attorney, Agent, or Firm*—Lowe, Price, LeBlanc & Becker

[57] ABSTRACT

A power control apparatus for controlling power supplied to an electric motor rotating a rotor employed in a centrifuge is provided. The power control apparatus includes first and second inverters and a smoothing capacitor disposed between the first and second inverters. In a motor power mode, the first inverter charges the smoothing capacitor with power supplied by an AC power supply, while the second inverter charges, in a motor braking mode, the smoothing capacitor with power regenerated by the motor during a braking operation for returning the regenerated power back to the AC power supply through the first inverter. An reactor is arranged between the AC power supply and the first inverter for reducing harmonic components contained in the current supplied from or back to the AC power supply.

4 Claims, 19 Drawing Sheets

| CYCLE \ SWITCHING ELEMENT | U | V | X | Y |
|---|---|---|---|---|
| POSITIVE | OFF | OFF | PWM SIGNAL 88 | OFF |
| NEGATIVE | OFF | OFF | OFF | PWM SIGNAL 88 |

| SWITCHING ELEMENT / CYCLE | U | V | X | Y |
|---|---|---|---|---|
| POSITIVE | ON | OFF | OFF | PWM SIGNAL 88 |
| NEGATIVE | OFF | ON | PWM SIGNAL 88 | OFF | ns
MOTOR CONTROL SYSTEM FOR CENTRIFUGAL MACHINE

This application is a continuation of application Ser. No. 08/495,962 filed Jun. 28, 1995, now U.S. Pat. No. 5,608,301.

BACKGROUND OF THE INVENTION

1. Technical Field

The present invention relates generally to a power control system for a centrifugal machine, and more particularly to a power control system for an electric motor driving a rotor of a centrifugal machine, which is designed to reduce harmonic components contained in the current supplied from or returned back to a power source during quick acceleration or deceleration of the rotor of the centrifugal machine for improving current waveform distortion and a power factor.

2. Background Art

FIG. 23 shows a conventional power control system for an electric motor of a centrifuge.

The power control system shown includes a power running thyristor bridge circuit 2, a regenerating thyristor bridge circuit 3, an inverter circuit 5 for driving an electric motor 4, a power factor-improving choke coil 6, and a smoothing capacitor 7. The power running thyristor bridge circuit 2 and the regenerating thyristor bridge circuit 3 are, as clearly shown, electrically oriented in directions reverse to each other in connection with an AC power supply 1 to have a bi-directional power-converting function.

A CPU 8 provides, as control signals, gating pulse signals to gates 2G and 3G of the power running thyristor bridge circuit 2 and the regenerating thyristor bridge circuit 3 through date-pulse delay timer LSIs 9 and 10, drivers 11 and 12, and pulse transformers 13 and 14. A timer LSI provides an oscillation output to an on-off pattern generating logic circuit (PLD) 16, which is, in turn, amplified by a base driver 17 to provide a base current to transistors of the inverter circuit 5.

A V-sensor 18 measures the voltage of the AC power supply 1 to provide a signal indicative thereof to a zero-cross circuit 19. The zero-cross circuit 19 then provides a reference phase signal to the CPU 8. When it is required to have a rotor 20 accelerate to a fixed speed through the motor 4, the CPU 8 phase-controls the power running thyristor bridge circuit 2 to perform PAM control for regulating a charged voltage in the smoothing capacitor 7 for V/F control of the motor 4. On the other hand, when it is required to have the rotor 20 decelerate through the motor 4, the CPU 8 phase-controls the regenerating thyristor bridge circuit 3 to transmit electrical energy produced by the motor 4 and stored in the smoothing capacitor 7 to the AC power supply 1.

Accordingly, in order to increase the speed of a rotor having a relatively large moment of inertia, the above type of centrifuge power control system needs to phase-control a power running thyristor bridge circuit and perform the PAM control for regulating a charged voltage in a smoothing capacitor for the V/F control of an electric motor for an extended period of time, thereby causing ac current containing a great harmonic component and having a decreased power factor to flow through the motor. This great harmonic component leads to distortion of a voltage waveform of a power supply, which may adversely affect a precision electric instrument such as an analyzer disposed around the centrifuge. Additionally, since a power supply capacity is usually restricted to a given value, the supply current having the decreased power factor disadvantageously requires temporarily stopping an operation of auxiliary equipment such as a temperature control unit controlling the temperature inside the centrifuge, a vacuum pump, and a diffusion pump during acceleration of a rotor, or dropping the acceleration of the rotor for ensuring a power supply for the auxiliary equipment. Similarly, decreasing the rotor in speed causes a harmonic current to be returned from a regenerating thyristor bridge circuit back to the power supply, thereby degrading the performance of the auxiliary equipment.

SUMMARY OF THE INVENTION

It is therefore a principal object of the present invention to avoid the disadvantages of the prior art.

It is another object of the present invention to provide a power control system for an electric motor of a centrifuge, which is designed to provide a high-efficiency alternating current whose harmonic components are decreased considerably for smooth acceleration and deceleration of a rotor having a relatively large moment of inertia.

According to one aspect of the present invention, there is provided a power control apparatus for controlling power supplied to a motor employed in a centrifugal machine which comprises a smoothing capacitor, a bi-directional supply power-converting unit, a bi-directional motor power-converting unit, a reactor, and a control unit. The bi-directional supply power-converting unit includes rectifying elements connected to form a circular rectifying circuit and switching elements each connected to one of the rectifying elements in parallel, and is connected at an ac terminal to an AC power supply and at a dc terminal to the smoothing capacitor for charging the smoothing capacitor. The bi-directional motor power-converting unit includes rectifying elements connected to form a circular rectifying circuit and switching elements each connected to one of the rectifying elements in parallel, and is connected at an ac terminal to the motor and at a dc terminal to the smoothing capacitor. The reactor is disposed between the AC power supply and the bi-directional supply power-converting unit. The control unit controls, in a motor power mode, the switching elements of the bi-directional motor power-converting unit with given operational timing to supply power to the motor and also controls the switching elements of the bi-directional supply power-converting unit with given operational timing to have the bi-directional supply power-converting unit function as a step-up converter to charge the capacitor. In a motor braking mode wherein the bi-directional motor power-converting unit charges the smoothing capacitor with power of the motor regenerated during a braking operation, the control unit controls the switching elements of the bi-directional supply power-converting unit with given operational timing to have the bi-directional supply power-converting unit function as a step-down converter to restrict a charged voltage of the capacitor from being increased above a preselected level for returning the power regenerated by the motor back to the AC power supply.

In the preferred mode of the invention, the control unit controls, in the motor braking mode, the switching elements of the bi-directional motor power-converting unit to provide a braking force to the motor.

An AC phase control element is disposed between the reactor and the bi-directional supply power-converting unit to regulate the charged voltage of the capacitor. Specifically, the AC phase control element controls phase of ac power of the AC power supply to provide the phase-controlled power to the capacitor through the bi-directional supply power-converting unit.

In a given power speed range of the motor, the control unit turns off all the switching elements of the bi-directional supply power-converting unit, allows the AC phase control element to control the charged voltage of the capacitor, and controls the switching elements of the bi-directional motor power-converting unit to modify a voltage applied to the motor under the control of the charge voltage of the capacitor by the AC phase control element.

The control unit includes a ROM, a counter, an oscillator, a plurality of capacitors, and a selector. The ROM stores therein on-off operational patterns for the switching elements of the bi-directional motor power-converting unit. The counter reads the on-off operational patterns out of the ROM in response to pulse signals having a preselected frequency outputted by the oscillator. The selector selects one of the plurality of capacitors to establish communication of the selected one with the oscillator for changing the frequency of the oscillator.

The plurality of capacitors each have different capacitances for providing different frequencies to the pulse signals produced by the oscillator. The capacitances are determined so as to allow the frequencies to partially overlap with each other.

The power control apparatus further includes a single power source, capacitors, diodes, and drive circuits connected to the single power source, activating the switching elements of the bi-directional motor power-converting unit, respectively. A first group of the switching elements is supplied with power from the capacitors which are charged by the single power source through the diodes and a second group of the switching elements. The control unit turns on and off the second group of the switching elements while maintaining the first group of the switching elements turned off for a given period of time when the selector selects one of the plurality of capacitors.

According to another aspect of the invention, there is provided a power control apparatus for controlling power supplied to a motor employed in a centrifuge which comprises a first smoothing capacitor, a second smoothing capacitor, a bi-directional supply power converting unit, a bi-directional motor power-converting unit, a dc power-converting unit, and a control unit. The bi-directional supply power-converting unit includes rectifying elements connected to form a circular rectifying circuit and switching elements each connected to one of the rectifying elements in parallel, and is connected at an ac terminal to an AC power supply and at a dc terminal to the first smoothing capacitor for charging the first smoothing capacitor. The bi-directional motor power-converting unit includes rectifying elements connected to form a circular rectifying circuit and switching elements each connected to one of the rectifying elements in parallel, and is connected at an ac terminal to the motor and at a dc terminal to the second smoothing capacitor. The dc power-converting unit is disposed between the bi-directional supply power-converting unit and the bi-directional motor power-converting unit. The control unit controls, in a motor power mode, the switching elements of the bi-directional motor power-converting unit with given operational timing to supply power to the motor, and also controls the dc power-converting unit to function as a step-down converter acting on the first smoothing capacitor for charging the second capacitor at a preselected level. In a motor braking mode wherein the bi-directional motor power-converting unit charges the second smoothing capacitor with power of the motor regenerated during a braking operation, the control unit controls the switching elements of the bi-directional supply power-converting unit with given operational timing for returning the power regenerated by the motor back to the AC power supply, and also controls the dc power-converting unit to function as a step-up converter acting on the second smoothing capacitor for allowing the first capacitor to be charged at a given level.

In the preferred mode of the invention, an reactor is disposed between the AC power supply and the bi-directional supply power-converting unit.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 21 is a table which shows on-off operation patterns of switching element of a dc power-converting circuit;

DESCRIPTION OF THE PREFERRED EMBODIMENT

Figure 1:
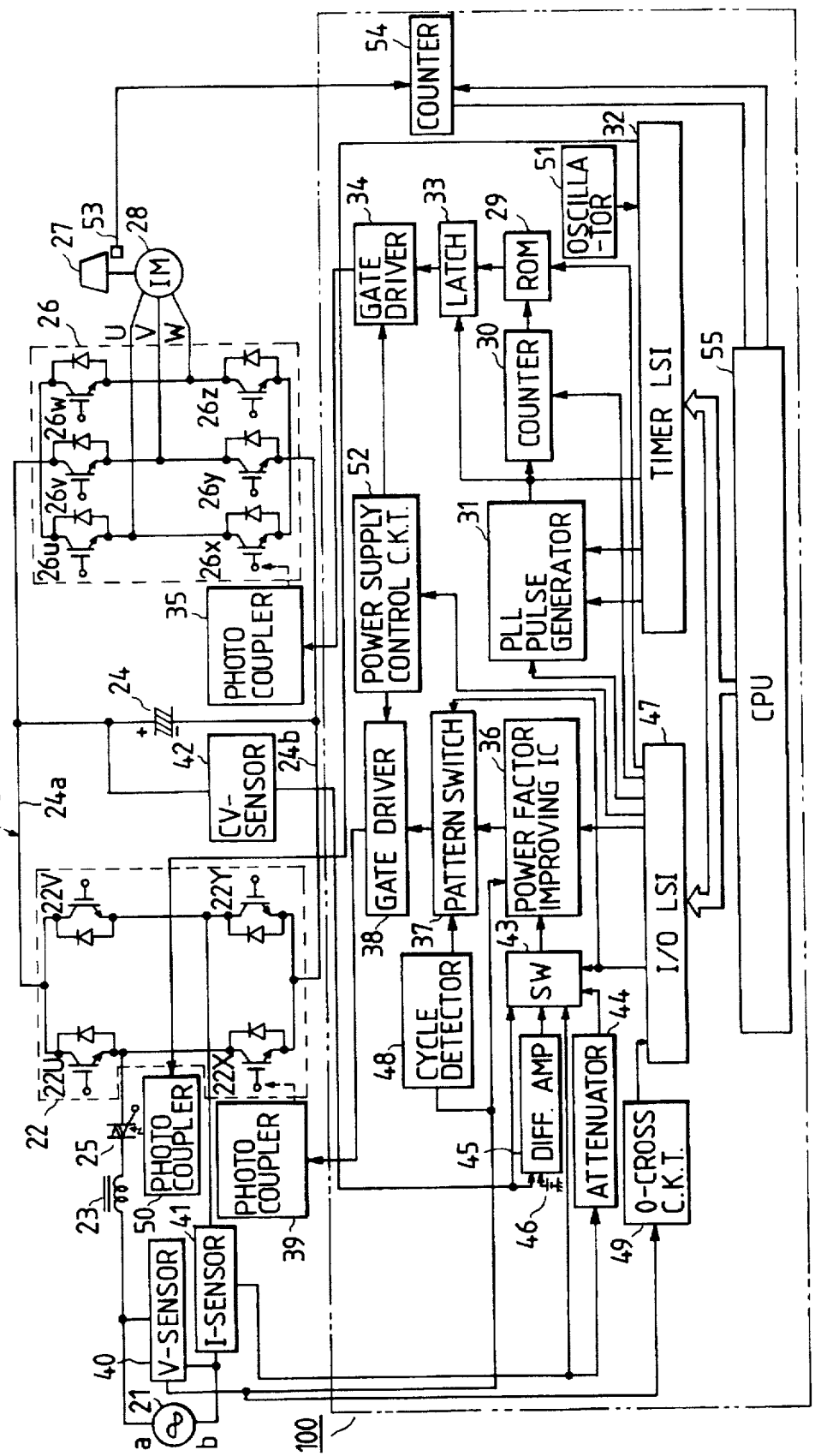
FIG. 1 is a circuit block diagram which shows a power control system for an electric motor of a centrifuge according to the present invention.

Referring now to the drawings, wherein like reference numbers refer to like parts in several views, particularly to FIG. 1, there is shown a power control system for a centrifuge according to the present invention.

The power control system includes generally a bi-directional supply power-converting circuit 22, a bi-directional motor power-converting circuit 26, and a control circuit 100.

The bi-directional supply power-converting circuit 22 includes rectifying devices constituting a circulating rectifier and switching elements 22U, 22V, 22X, and 22Y such as bipolar transistors, IGBTs, or FETs connected in parallel to the rectifying devices. The bi-directional supply power-converting circuit 22 is connected at alternating current terminals to an AC power supply 21 through a reactor 23 and a switching circuit 25, and at direct current terminals to a smoothing capacitor 24. The switching circuit 25 includes an AC phase control element such as a triac operable to perform phase-control for regulating a charged voltage in the smoothing capacitor 24.

The bi-directional motor power-converting circuit 26 includes rectifying devices constituting a circular rectifier and switching elements 26u, 26v, 26w, 26x, 26y, and 26z similar to those of the bi-directional supply power-converting circuit 22, connected in parallel to the rectifying devices, and communicates at alternating current terminals with an induction motor 28, and at direct current terminals with the smoothing capacitor 24. The induction motor 28 rotates a rotor 27 disposed within a centrifugal machine (not shown). The smoothing capacitor 24 has anode lines 24a and cathode lines 24b connected to the circuits 22 and 26.

The control circuit 100 includes a ROM 29 which stores therein on-off operation patterns for the switching elements of the bi-directional motor power-converting circuit 26 under PMW inverter control. Specifically, the ROM 29 reads out data on pulse patterns formed with logic 1s and 0s in response to a timing signal outputted from a counter 30 through an address line. The counter 30 is responsive to a clock signal from a PLL (Phase-locked loop) pulse generator 31 to provide the timing signal to the ROM 29. The frequency of the clock signal of the PLL pulse generator 31 is controlled by a timer LSI 32. A latch 33 synchronizes the output data provided from the ROM 29. A gate driver 34 is responsive to a logic output from the latch 33 to drive a photo coupler circuit 35 to provide signals for controlling on-off conditions of the switching elements of the bi-directional motor power-converting circuit 26.

A power factor-improving IC 36 provides a pulse-width control output to a gate driver 38 through a pattern switching circuit 37. The gate driver 38 then amplifies it to drive a photo coupler circuit 39. The photo coupler circuit 39 provides signals to the bi-directional supply power-converting circuit 22 for controlling on-off timings of the switching elements.

The power factor-improving IC 36 receives sensor signals outputted from a V-sensor 40, an I-sensor 41, and a CV-sensor 42, respectively. The V-sensor 40 includes, for example, an isolation transistor which detects a voltage waveform of the power supply 21. The I-sensor 41 includes, for example, a hall current sensor which detects a current waveform of the power supply 21. The CV-sensor 42 includes, for example, an assembly consisting of V-F and F-V converters which detects a charged voltage of the smoothing capacitor 24. The power factor-improving IC 36 controls, based on the sensor inputs, the bi-directional supply power-convening circuit 22 so as to function as a step-up converter in cooperation with the reactor 23 in a forward operation for charging the smoothing capacitor to a constant voltage level during power running of the motor 28 at a current containing a decreased harmonic current which is similar to a voltage waveform of the AC power supply 21. The power factor-improving IC 36 also controls the bi-directional supply power-converting circuit 22 so as to function as a step-down converter in a backward operation for discharging the smoothing capacitor 24 down to a constant voltage level during a regenerating operation of the motor 28.

An attenuator 44 switches the amplitude of a signal outputted from the I-sensor 41. A differential amplifier 45 subtracts a reference voltage of a reference voltage source 46 from a signal level provided by the CV-sensor 42. An analog switch 43 receives signals from the attenuator 44 and the differential amplifier 45, and is responsive to a signal from an I/O-LSI 47 to perform a switching operation along with the pattern switching circuit 37 for allowing the bi-directional supply power-converting circuit 22 to operate both in the forward operation and the backward operation under the same control of the power factor-improving IC 36.

A positive/negative cycle detector 48 detects positive and negative cycles of the AC power supply 21 to provide a logic signal to the pattern switching circuit 37. A 0-cross circuit 49 provides a 0-cross signal indicative of a zero-crossing of a voltage waveform of the AC power supply 21 to the I/O-LSI 47 for phase control of the AC phase control element 25. An oscillator 51 provides a reference clock to the PLL pulse generator 31 through the timer LSI 32. The AC phase control element 25 is controlled by a signal outputted from the timer LSI 32 through the photo coupler circuit 50. A power control circuit 52 supplies drive power to gate drivers 34 and 38 for restricting ON signals from being applied to the switching elements of the bi-directional power supply-converting circuit 22 and the bi-directional motor power-converting circuit 26 when a malfunction such as an so-called arm-short circuit wherein switching elements arranged on an upper arm and the switching elements arranged on a lower arm are activated simultaneously, or overcurrent of the circuits 22 and 26 takes place at the time of switching of operation control, or until all system operations are placed in starting conditions following activation of the AC power supply 21.

The control circuit 100 further includes a counter 54 and a CPU 55. The counter 54 counts sensor signals provided from a speed sensor 53 to determine a rotational speed of the rotor 27. The CPU 55 controls the timer LSI 32, the I/O-LSI 47, and the counter 54 for controlling on-off operations of the switching elements of the bi-directional supply power-converting circuit 22 and the bi-directional motor power-converting circuit 26.

Figure 2:
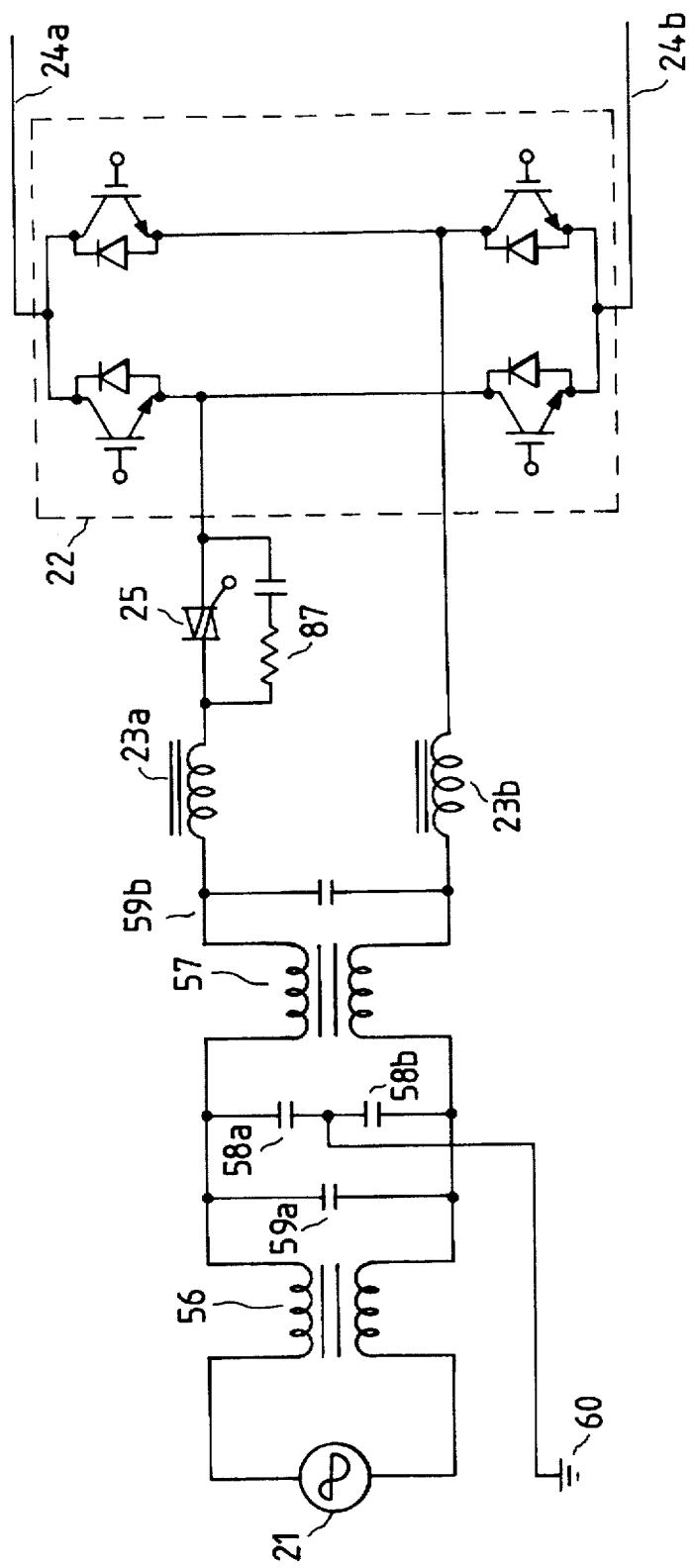
FIG. 2 is a circuit diagram which shows a modification of a circuit extending from an AC power supply to a bi-directional motor power-converting circuit.

As can be seen from the above, the V-sensor 40, the I-sensor 42, the CV-sensor 42, and the photo coupler circuits 35, 39, and 50 constitute a signal isolating means isolating in reference voltage a power circuit including the bi-directional supply power converting circuit 22 and the bi-directional motor power-converting circuit 26 from a signal circuit of the control unit 100 for preventing electrical noise produced by high-speed switching operations of the AC phase control element 25 and/or the bi-directional supply power-converting circuit 22 and the bi-directional motor power-converting circuit 26, from causing a malfunction of the control unit 100. Additionally, in order to prevent the above noise from entering the other circuits connecting with the AC power supply 21, a circuit arrangement, as shown in FIG. 2, may be employed. The circuit arrangement shown includes reactors 23a and 23b arranged on both lines of the AC power supply 21, a low-frequency filter 56, a high-frequency filter 57, common mode noise-bypassing capacitors 58a, and 58b, normal mode noise-bypassing capacitors 59a and 59b, and a snubber circuit 87. The low-frequency filter 56 and the high-frequency filter 57 may be provided with common mode choke coils, respectively. The filters 56 and 57 and the capacitors 58a, 58b, 59a, and 59b are connected through a common line to the ground 60. The snubber circuit 87 includes a resistor and a capacitor arranged in series, and serves as an AC phase control element.

An operation of the above discussed power control system will be described below with reference to FIGS. 3 to 15.

Figure 5:
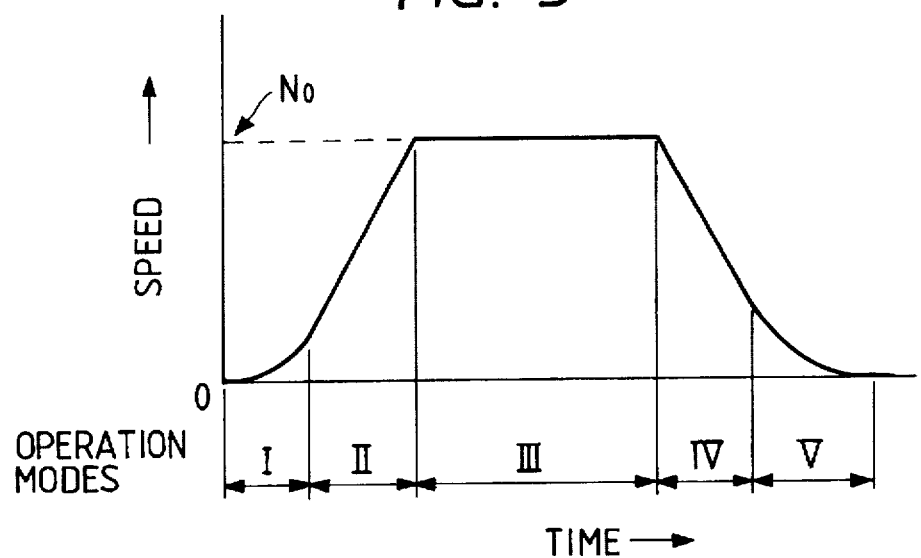
FIG. 5 is a graph which shows operation modes of a motor for a centrifuge.
Figure 6:
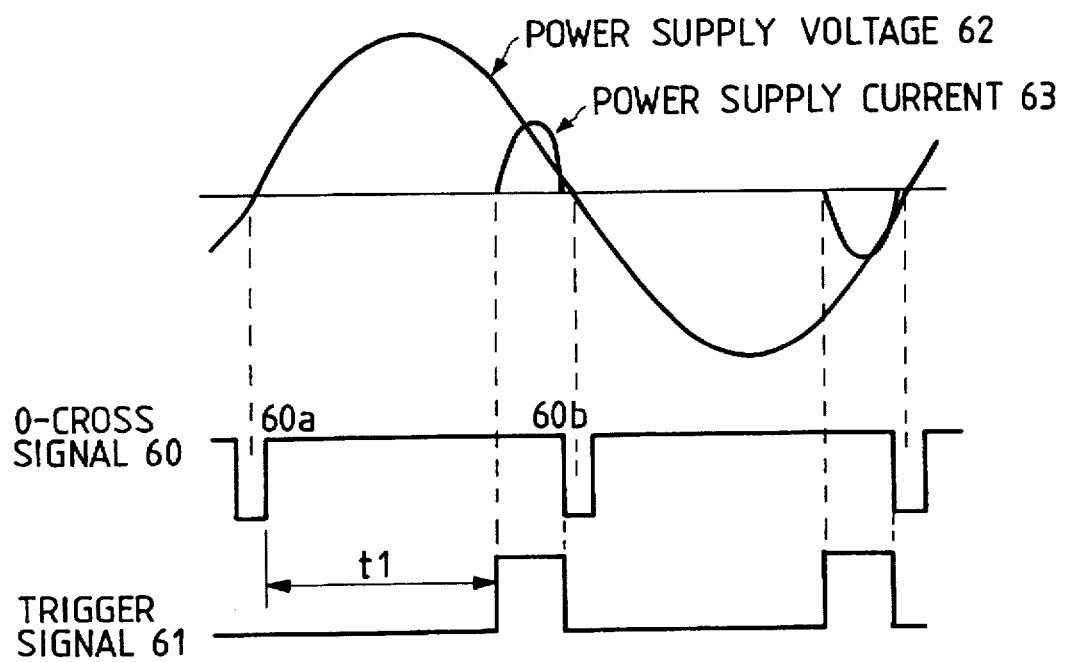
FIG. 6 is a time chart which shows a power supply voltage and a power supply current.

FIG. 5 is a graph which shows a variation in speed of the rotor 27, i.e., the motor 28 with respect to time. In an operation mode I, the motor 28 starts to rotate the rotor 27 and increases the speed thereof slowly under PAM control as well as PWM control. Specifically, the CPU 55 controls the motor 28 at the speed along with a curve shown in FIG. 5 under the PAM control which regulates a charged voltage of the smoothing capacitor 24 through the AC phase control element 25 and the PWM control performed by the bi-directional motor power-converting circuit 26. In the PAM control, as schematically shown in FIG. 6, the CPU 55 controls the timer LSI 32 to generate a trigger signal 61 after a delay t1 following generation of a reference signal provided by a leading edge 60a of a O-cross signal 60 outputted from the O-cross circuit 49. The trigger signal 61 is then outputted to the AC phase control element 25 at a given energization angle so that a current 63 which is shifted in phase relative to a voltage waveform 62 of the AC power supply 21 flows through the smoothing capacitor 24 to regulate the charged voltage thereof. Note that the trigger signal 61 is turned off at a trailing edge of the O-cross signal 60.

Figure 7:
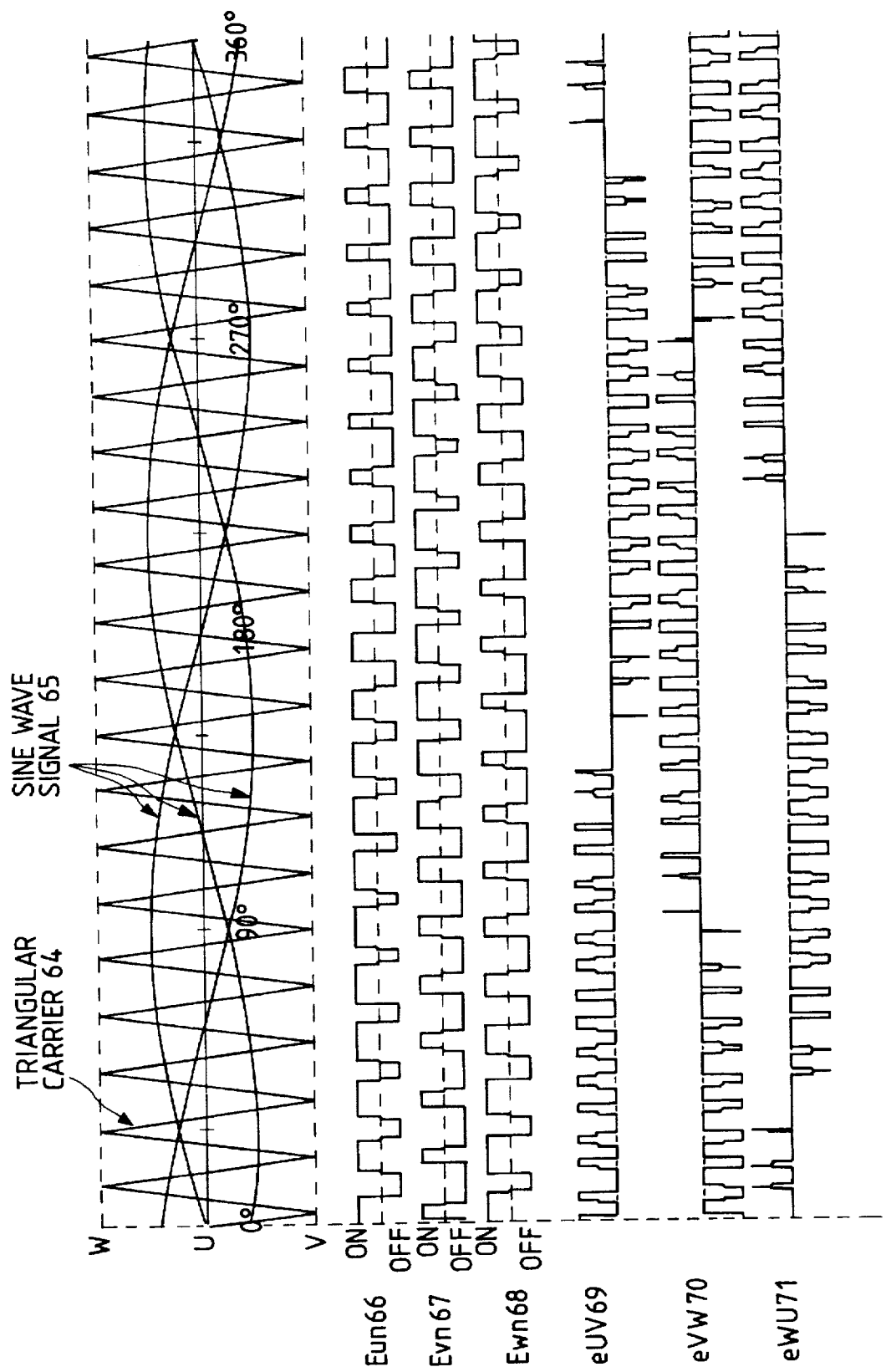
FIG. 7 is a time chart which shows waveforms provided by a three-phase PWM inverter based on pulse patterns for switching elements.

In the PWM control, the six switching elements 26u, 26v, 26w, 26x, 26y, and 26z of the bi-directional motor power-converting circuit 26 are activated in on-off operation patterns which are stored in the ROM 29 and predetermined so that a three-phase PWM inverter (i.e., the bi-directional motor power-converting circuit 26) provides a triangular carrier 64 and sine-wave signals 65, as shown in FIG. 7. Pulse trains Eun 66, Evn 67, and Ewn 68 provide ON signals for the switching elements 26u, 26v, and 26w, and OFF signals for the switching elements 26x, 26y, and 26z. Pulse trains eUV 69, eVW 70, and eWU 71 represent voltage waveforms supplied between U and V phases, between V and W phases, and between W and V phases of the motor 28. Note that FIG. 7 shows an example wherein the number of cycles of the triangular carrier 64 over 360° is twenty one and a duty factor of the sine waves is 50%.

An operation of the control unit 100 under the PWM control will be discussed with reference to FIG. 3.

The data stored in the ROM 29 is supplied to the latch 33 and the gate driver 34. In the circuit arrangement in FIG. 3, the latch 33 and the gate driver 34 are provided with a D-type flip flop such as a 74HC374 device (hereinafter, referred to as a latch-gate driver circuit 120). The latch-gate driver circuit 120 is responsive to a reverse signal 72 to an output of the PLL pulse generator 31 appearing on a terminal CK to be latched synchronously to drive the photo coupler circuit 35 for turning on and off the switching elements 26u to 26z of the bi-directional motor power-converting circuit 26. Data output terminals O1 to O6 of the ROM 29 are, as shown in the drawing, connected to terminals 1Q to 6Q of the latch-gate driver circuit 120, respectively. Terminals 19 to 69 are connected to u to z lines, respectively. For example, when a logic low level signal (i.e., logic 0) appears on the terminal O1 of the ROM 29, the latch-gate driver circuit 120 provides a logic low level signal at the terminal 1Q to turn on the photo coupler circuit 35 through a resistor 80, thereby turning on the switching element 26u. The latch-gate driver circuit 120 switches the logic low level signal to a high-impedance output at a terminal OC when a logic high level signal (i.e., logic 1) appears on an output line 85 of the I/O-LSI 47. Photo couplers of the photo coupler circuit 35 are thus all turned off.

Figures 8, 9:
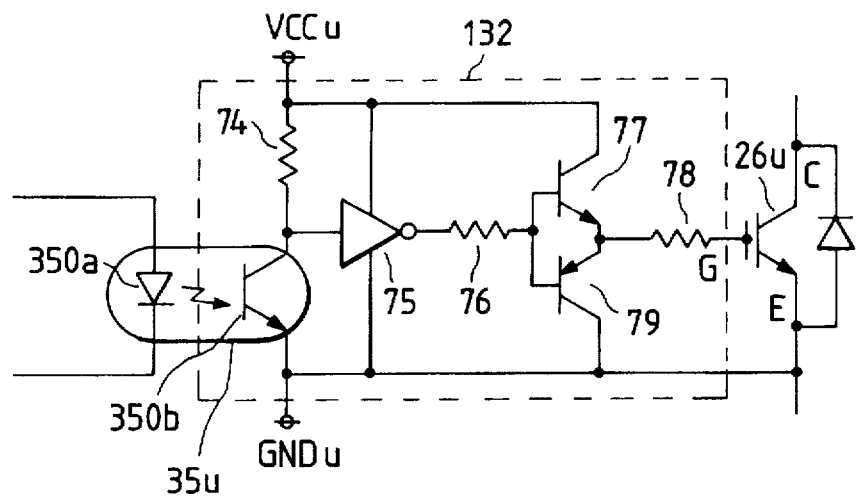
FIG. 8 is a circuit diagram which shows a circuit connecting a photo coupler with a switching element.
FIG. 9 is a table which shows on-off operations of switching elements of a bi-directional motor power-converting circuit in a motor power mode.

FIG. 8 shows, as an example, a drive circuit 132 connecting between a photo coupler 35u of the photo coupler circuit 35 and the switching element 26u of the bi-directional motor power-converting circuit 26. The drive circuit 132 includes a power supply Vccu connecting with an emitter E of the switching element 26u at a reference voltage GNDU. When the power supply Vccu supplies the current to a light-emitting diode (LED) 35ua of the photo coupler 35u, a phototransistor 35ub is turned on so that a resistor 74 produces no bias, thereby causing a NOT gate 75 to provide a logic high level signal to a base of transistor 77 through a resistor 76. The transistor 77 then applies a voltage bias to a gate G of the switching element 26u through a breaking resistor 78 to turn on the switching element 26u. When the current supplied to the light-emitting diode 35ua disappears, the NOT gate 75 provides a logic low level signal to discharge the date G of the switching element 26u through the transistor 79 so that the switching element 26u is turned off.

Referring back to FIG. 3, the readout operation of the ROM 29 is accomplished by counting up through the counter 30 leading edges of pulses outputted from the PLL pulse generator 31 to provide count outputs from count terminals Q0 to Q10 to address lines A0 to A10 of the ROM 29. The counter 30 may be provided with three 74HC193 devices arranged in the cascade connection.

The ROM 29 has the eleven address lines A0 to A10 for dividing the on-off pattern over 360° shown in FIG. 7 into 2048 for driving the switching elements. The above mentioned latching operation of the latch-gate driver circuit 120 in response to the leading edge of the pulse signal 73 from the PLL pulse generator 31 is performed for preventing the on-off timings of the switching elements of the bi-directional motor power-converting circuit 26 from being shifted caused by a slight shift in output timing of data read out at the terminals O1 to O6 of the ROM 29 in response to the leading edge of the pulse signal 73 from the PLL pulse generator 31, which can lead to the so-called arm short-circuit wherein the switching elements on the different arms of the bi-directional motor power-converting circuit 26, for example, the switching elements 26u and 26x are turned on simultaneously.

A CLR terminal of the counter 30 is a count clear terminal provided for reading data out of the ROM 29 at an address 0. The counter 30 is cleared when a logic high level signal appears on the control line 86 of the I/O-LSI 47. The pulse signal 73 of the PLL pulse generator 31 is provided from a terminal VCOOUT of a PLL element 69 such as a 74HC4046 device. The timer LSI 32 includes, for example, a UPD8253 device which divides an oscillation output from the oscillator 51 through a divider 32a to provide a reference signal 70 to a terminal SiN of the PLL element 69 and also divides the pulse signal 73 from the PLL pulse generator 31 through a divider 32b to provide a comparison signal 71 to a terminal CiN of the PLL element 69 so that a phase comparator outputs an error signal from a terminal PC to apply through a low-pass filter 81 including resistors and capacitors a voltage bias to a terminal VCOiN. A VCO (voltage-controlled oscillator) 82 then produces an oscillation output as the pulse signal 73 having a frequency derived by multiplying the frequency of the reference signal 70 by an inverse number to a dividing ratio of the divider 32b. It is advisable that the oscillation output of the VCO 82 falls within a wide range of 10 kHz to 6.9 MHz for activating a motor within a range of 0 to 200 $Kmin^{-1}$ in the case of a ultra-centrifugal machine. To this end, an analog multiplexer 83 including, for example, a 74HC4051 device is provided which selects one of capacitors C1 to C5 connected to terminals X1 to X5 in parallel to establish only communication of the selected one with the PLL element 69. Note that the capacitors C1 to C5 each have different capacitances. In the operation mode I, the frequency of a pulse signal from the pulse generator 31 is low and the speed of the motor 28 is low. Thus, a capacitor-switching signal is inputted from the I/O-LSI 47 through a capacitor-switching signal line 84 to a terminal CSEL of the analog multiplexer 83 to select the capacitor C1 having the greatest capacitance. Note that a capacitor CO always communicates with the PLL element 69 for preventing the oscillation output from the PLL element 69 from being varied greatly at the time the capacitors C1 to C5 are switched.

As apparent from the above discussion, in the operation mode I, the power supply to the motor 28 is controlled under the PAM control using the AC phase control element 25 and the PWM control using the pulse patterns stored in the ROM 29, and the PLL pulse generator 31 provides an optimum slip frequency f1 to the motor 28 so that the rotor 27 accelerates slowly. Additionally, the phase-controlled current 63 flows through the circuit, but its current value is low so that it contains a small amount of high-frequency components. In order to match an actual speed of the motor 28 with a desired change in speed of the rotor 27 in the operation mode I, the so-called PID operation is performed to derive a difference between an instantaneous speed of the motor 28 and a preselected desired speed of the rotor 27 for determining the delay time t1 provided by the timer LSI 32 and the slip frequency f1 produced by the PLL pulse generator 31.

In an operation mode II shown in FIG. 5, the rotor 27 is controlled to accelerate quickly to a target speed No. The switching elements 22U, 22V, 22X, and 22Y of the bi-directional supply power-converting circuit 22 are, as clearly from the above discussion, all turned off in the operation mode I, however, in the operation mode II, they are selectively turned on and off, as described below, so that the bi-directional supply power-converting circuit 22 functions as a step-up converter which provides the current having a waveform similar to a voltage waveform of the AC power supply 21 to charge the smoothing capacitor 24 to a constant voltage.

The operation of the control unit 100 in the operation mode II will be described below with reference to FIG. 4.

The power factor-improving IC 36 outputs from a terminal O a PWM control signal 88 to the pattern switching circuit 37. In the pattern switching circuit 37, AND gates 89, 90, 91, and 92 perform AND operations on the PWM control signal 88 and logic 1 outputted from a terminal P of the positive/negative cycle detector 48 during a positive cycle of the AC power supply 21 or logic 1 outputted from a terminal N of the positive/negative cycle detector 48 during a negative cycle of the AC power supply 21, and provide signals to a data selector 93 composed of, for example, a 74HC158 device. In this case, a select signal line 94 of the I/O-LSI 47 is kept at a 0 level, so that a signal inputted to a terminal 1A is logically reversed and outputted from a terminal 1Y to the gate driver 38. The gate driver 38 then drives the photo coupler circuit 39 through a drive current-restricting resistor 95. FIG. 9 shows pulse patterns provided from the pattern switching circuit 37 to the switching elements. 22U, 22V, 22X, and 22Y of the bi-directional supply power-converting circuit 22. The photo coupler 39 and the switching elements 22U, 22V, 22X, and 22Y are connected through a drive circuit similar to the one shown in FIG. 8. Note that the positive cycle used in this discussion is produced when a terminal a of the AC power supply 21 shown in FIG. 1 is at a high voltage level, while a terminal b is at a low voltage level.

The generation of the PWM control signal 88 will be discussed below.

Figure 10:
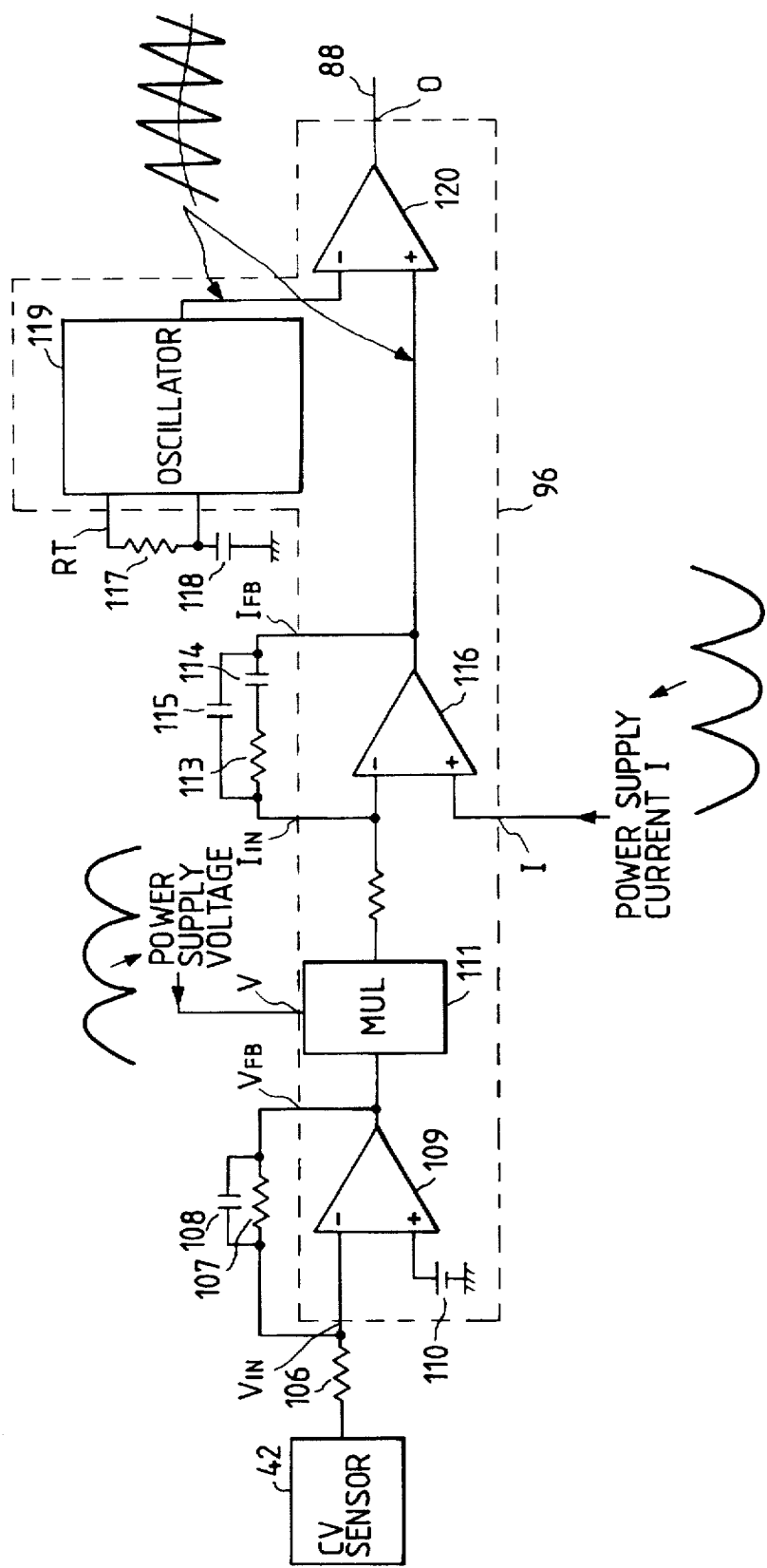
FIG. 10 is a circuit diagram which shows a structure of a power factor-improving IC.

The power factor-improving IC 36, as shown in FIG. 10 includes a control IC 96 which may be provided with a FA5331 device manufactured by the Fuji Denki Co. Ltd in Japan. To a terminal V of the control IC 96, an output of the V-sensor 40 is, as shown in FIG. 4, supplied through a full-wave rectification circuit 97. The I-sensor 41 outputs a sensor signal to a voltage divider 102 through a full-wave rectification circuit 98. The voltage divider 102 includes resistors 99 and 101, and provides a fraction of the applied voltage as a current feedback signal to a terminal XA of an analog switch 43 provided with, for example, a 74HC4053 device, which is, in turn, outputted from a terminal X. The CV-sensor 42 outputs a charged voltage of the smoothing capacitor 24 as a feedback signal to a terminal YA of the analog switch 43, which is, in turn, outputted from a terminal Y. The CV-sensor 43 includes a resistors 103 and 123, a V/F converter 104, a photo coupler 105, and a F/V converter 105. The resistors 103 and 123 provide a fraction output of the charged voltage of the smoothing capacitor 24 to the V/F converter 104. The V/F converter 104 then converts it into a pulse signal having a frequency proportional to an input voltage. The pulse signal is then isolated by the photo coupler 105 from a ground level, and converted by the F/V converter 160 into a voltage signal proportional to the frequency of the pulse signal. The voltage signal is then inputted to a terminal YA of the analog switch 43 as indicating the voltage of the smoothing capacitor 24.

Since the logic low level signal, as mentioned above, appears on the select signal line 94, the analog switch 43 transmits the input signal entering the terminal XA to the terminal X, and the input signal entering the terminal YA to the terminal Y. Thus, the charged voltage of the smoothing capacitor 24 is amplified and compared with a reference voltage 110, as shown in FIG. 10, through a resistors 106 and 107, a filter capacitor 108, and an OPAMP 109. If, for example, the voltage of the AC power supply 21 is 100 V, the charged voltage of the smoothing capacitor 24 is maintained at 170 to 180 V. The then power-supply current I will be similar to a power-supply voltage V. Specifically, an error signal output $V_{FB}$ provided by the OPAMP 109 is multiplied by the power-supply voltage V through a multiplier 111 to produce a multiplied output $I_{IN}$. An output $I_{FB}$ amplified by resistors 112 and 113, capacitors 114 and 115, and an OPAMP 116 is compared through a PWM comparator 120 with a serrate wave signal produced by an oscillator 119 having resistors 117 and 118 so as to match the power-supply current I with the multiplied output $I_{IN}$, and then outputted from a terminal O of the PWM comparator 120 as a PWM control signal 88.

Therefore, for example, when the AC power supply 21 is in the positive cycle, the switching element 22X of the bi-directional supply power-converting circuit 22 is turned on and off in response to the PWM control signal 88 outputted from the terminal O, so that a circuit including the reactor 23 to the smoothing capacitor 24 constitutes the step-up converter. Thus, the charged voltage of the smoothing capacitor 24 is maintained constant regardless of a load level of the motor 26, and the power-supply current of the AC power supply 21 becomes similar to the power-supply voltage thereof, which includes almost no harmonic component. The reason for dividing the signal output from the I-sensor 41 through the voltage divider is to input the signal I (i.e., the power-supply current) of a greater level to the control IC 96 during a regenerating operation to decrease the distortion of a power-supply current waveform relative to a small amount of regenerating current since the regenerating current usually becomes smaller than a power-running current due to an energy loss of the motor 28.

Connected to the control IC 96 is a NOT gate 121 which enables the data selector 93 and the control IC 96 in response to the logic low level signal appearing on the control signal line 122 of the I/O-LSI 47.

As explained above, in the operation mode II, the charged voltage of the smoothing capacitor 24 is maintained constant and thus the V/F control for the motor 28 is accomplished by changing the amplitude of the sine wave signals 65, as shown in FIG. 7, or a duty factor of the voltage applied to the motor 28 in a stepwise fashion, changing blocks of the ROM 29 in which the on-off operation patterns are stored, increasing a dividing ratio of the divider 32b of the timer LSI 32 sequentially, and selectively switching the capacitors C1 to C5 connected to the PLL element 69 to provide a slip frequency to the motor 28 according to the speed of the motor 28. This permits the rotor 27 to accelerate to the target speed No.

Figure 11:
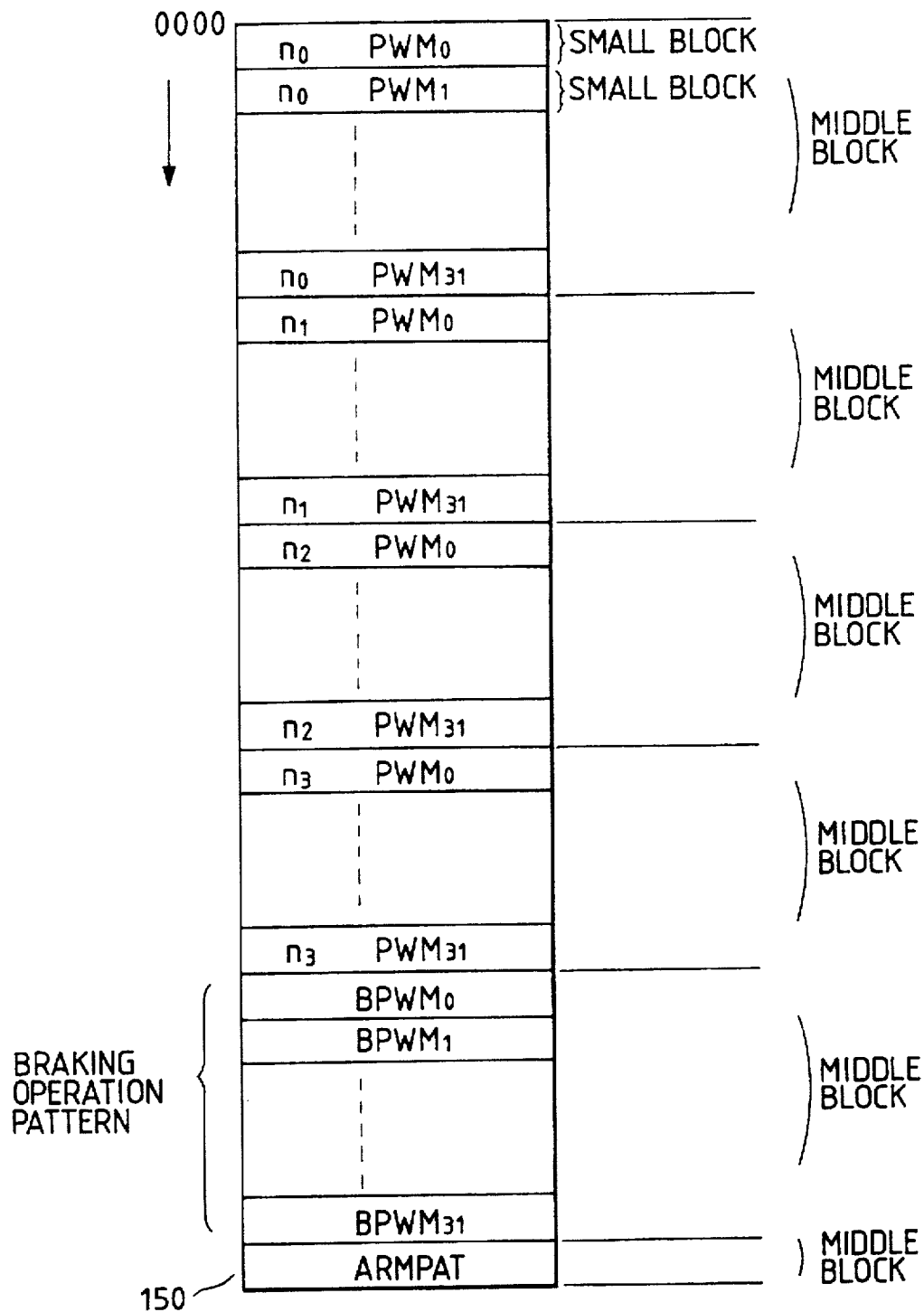
FIG. 11 is an explanatory view which shows data blocks stored in a ROM for activating switching elements.

FIG. 11 shows the contents of blocks stored in the ROM 29. Each of middle blocks contains 32 small blocks PWM0 to PWM31. For example, the small block no-PWM0 provides the smallest duty factor, while the small block no-PWM31 provides the greatest duty factor of the voltage applied to the motor 28. The middle block no-PWM is different from the n1-PWM in number of cycles of the triangular carrier 64 over 360°. Specifically, the number of cycles of the triangular carrier 164 is decreased according to an increase in speed of the motor 28 for preventing the number of switching operations of the switching elements of the bi-directional motor power-converting circuit 26 from being increased considerably which would result in elevation in temperature of the switching elements. For instance, the number of cycles of the carrier 164 set in blocks n3 is smaller than that in blocks n0. Additionally, the blocks n3 are used in a higher motor speed range than the blocks n0 and thus duty factors set in the blocks n3 are higher than those in the blocks n0. The small blocks are selected in response to a signal on the control line 124 shown in FIG. 3 connected from the I/O-LSI 47 to the address lines A16 to A18 of the ROM 29. The middle blocks are selected in response to a signal on the control line 125 connected to the address lines A16 to A18.

Figure 3:
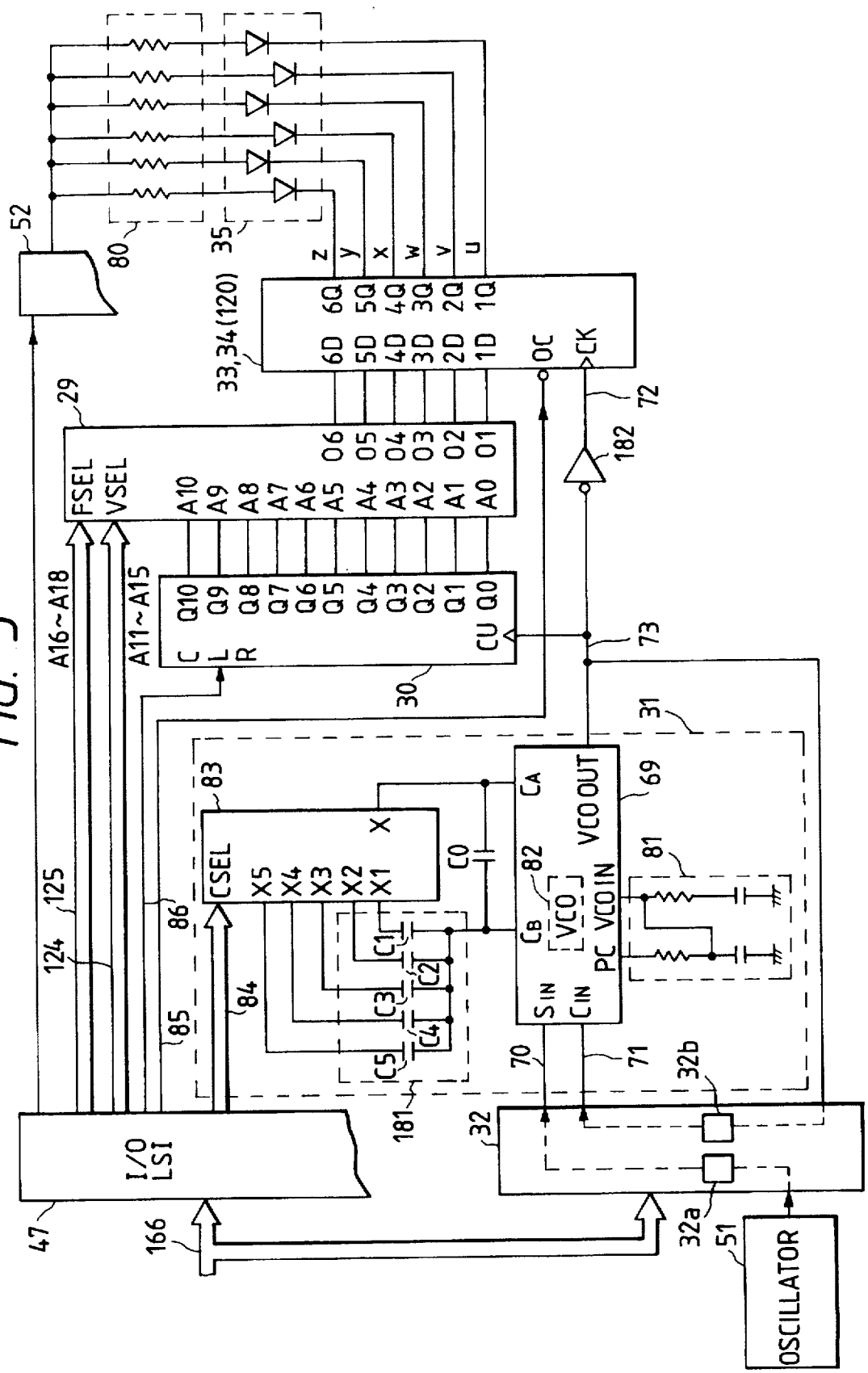
FIG. 3 is a circuit block diagram which shows an operation of a photo coupler driving a bi-directional motor power-converting circuit.
Figures 12, 13:
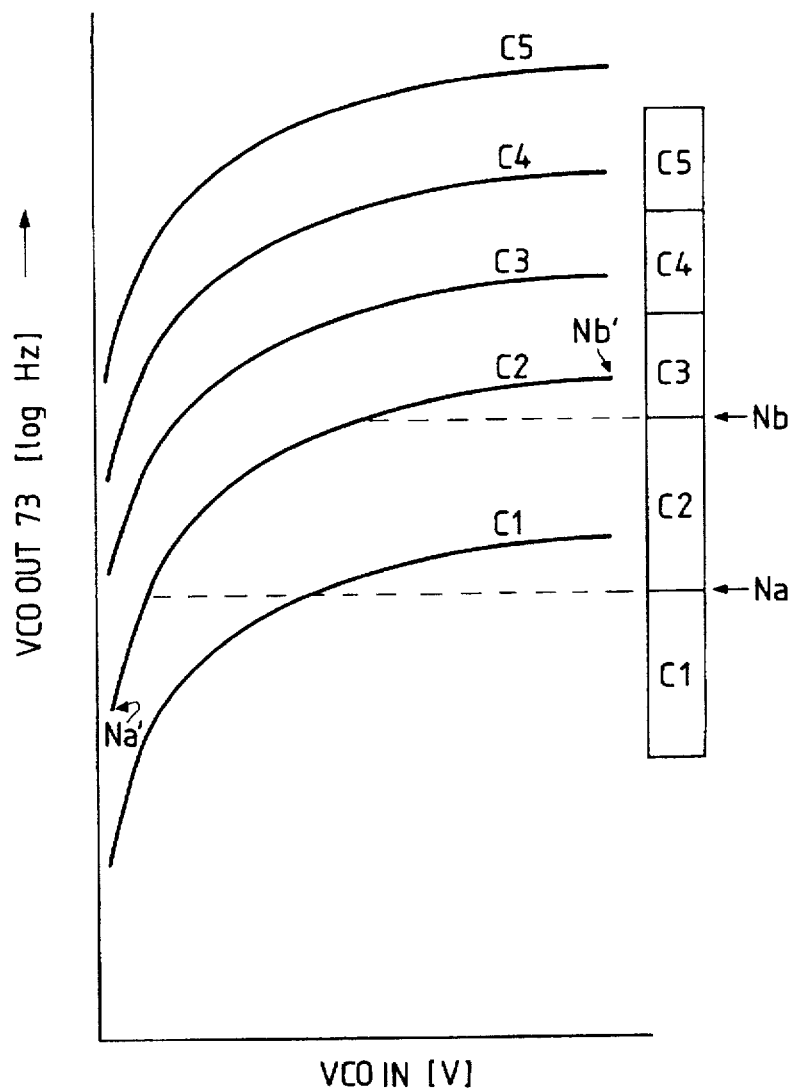
FIG. 12 is a graph which shows a relation between an input voltage to a pulse generator and output frequencies in terms of capacitors having different capacitances.
FIG. 13 is a table which shows on-off operations of switching elements of a bi-directional motor power-converting circuit in a power regenerating mode.

FIG. 12 illustrates in a logarithmic scale the frequencies of the pulse signal 73 shown in FIG. 3 outputted from the terminal VCOOUT of the PLL element 69 of the PLL pulse generator 31 in response to a voltage bias varied in a linear scale inputted to the terminal VCOIN under the frequency control for the motor 28 in terms of the capacitors C1 to C5 connected to the PLL element 69. For example, when a target controlled speed of the motor 28 is within a range from Na to Nb, the capacitor C2 is selected to provide a frequency required for controlling the motor 28. The range of Na to Nb within which the capacitor C2 is used is defined slightly inside a range of Na' to Nb' which can be actually provided by the capacitor C2 in view of the fact that when a target controlled speed is Nb, the speed of the motor 28 is usually converged at Nb with a slight overshoot. Further, usable speed ranges covered by the capacitors C1 to C5 partially overlap with each other for reducing a variation in voltage inputted to the terminal VCOIN as much as possible so as to produce an oscillation output of a stable frequency when one of the capacitors C1 to C5 is switched to another. The selection of the capacitors is, as already mentioned, made in response to a signal appearing on the capacitor-switching signal line 84.

In an operation mode III shown in FIG. 5, the rotor 27 is maintained at the target constant speed No. The bi-directional supply power-converting circuit 22, similar to the operation mode II, serves as the step-up converter for providing a current similar to a voltage waveform of the power supply 21, and performs the forward operation to charge the smoothing capacitor 24 to a constant voltage level. For instance, if a maximum operation speed of the centrifugal machine or the rotor 27 is No, a block n3-PWM31 is selected from the ROM 29 to provide a minimum number of cycles of the carrier and a maximum duty factor, and the capacitor C5 is selected to provide a higher frequency. The CPU 55 performs the PID operations to calculate a difference in speed between the target speed No and an actual speed of the motor 28 to determine the slip frequency f1 for control of the motor 28, and then finds a dividing ratio of the divider 32b of the timer LSI 32 for providing the determined slip frequency f1.

In an operation mode IV shown in FIG. 5, a regenerating brake is applied on the rotor 27 to decrease the speed thereof quickly. The bi-directional supply power-converting circuit 22 shown in FIG. 4 serves as a step-down converter for returning a current similar to the voltage waveform of the AC power supply 21 back to the AC power supply 21. Specifically, the bi-directional supply power-converting circuit 22 performs the backward operation to restrain the charged voltage of the smoothing capacitor 24 from being increased to maintain it at a constant level.

Figure 4:
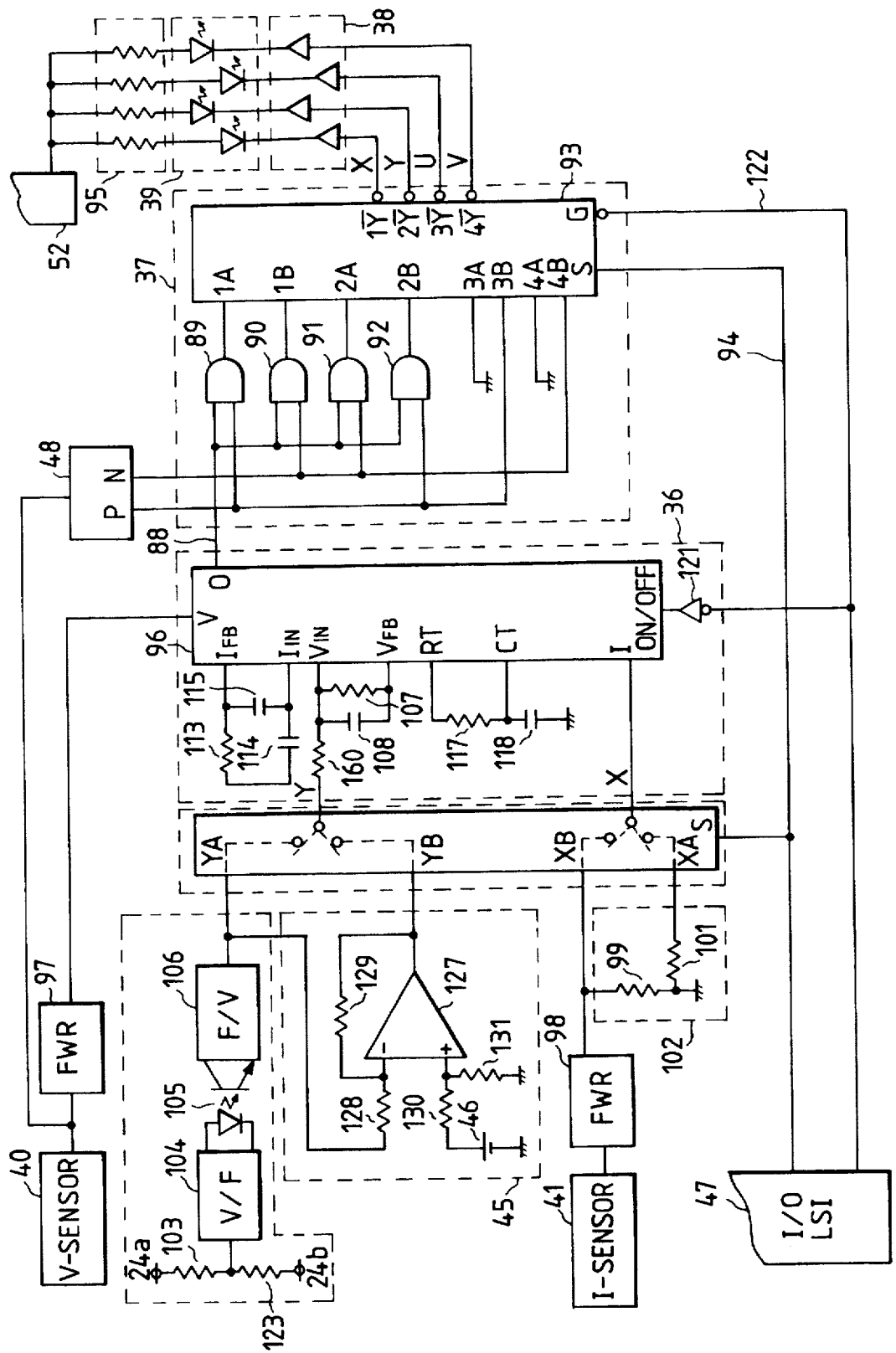
FIG. 4 is a circuit block diagram which shows an operation of a photo coupler driving a bi-directional supply power-converting circuit.

Referring to FIG. 4, a signal appearing on the select signal line 94 of the I/O-LSI 47 is maintained at a logic high level in the operation mode IV, so that signals appearing at the input terminals B of the data selector 93 are logically reversed and outputted from the output terminals Y. Specifically, the pattern switching circuit 37 provides ON and OFF signals, as shown in FIG. 13, to the switching elements 22U, 22V, 22X, and 22Y of the bi-directional supply power-converting circuit 22.

Explaining the production of the PWM control signal 88, since a logic high level signal also appears at the input terminal S of the analog switch 43, a signal inputted to the terminal XB from the I-sensor 41 through the full-wave rectification circuit 98 is outputted from the terminal X. A sensor signal indicative of a charged voltage of the smoothing capacitor 22 from the CV-sensor 42 subtracted from a reference voltage 126 through the differential amplifier 45 is inputted to the terminal YB of the analog switch 43 and then outputted from the terminal Y to the power factor-improving IC 36 as a charged voltage feedback signal for the smoothing capacitor 24. The differential amplifier 45 includes an OPAMP 127 and resistors 128, 129, 130, and 131, and decreases an output voltage according to an increase in charged voltage of the smoothing capacitor 24. Referring to FIG. 10, the output of the CV-sensor 42 is compared with the reference voltage 110 and amplified through the OPAMP 109 to produce the PWM control signal 88 under the activities of the control IC 96, as mentioned above, for maintaining the charged voltage of the smoothing capacitor 24 at 160 to 170 V if the voltage of the AC power supply is 100 V.

Specifically, for example, when the AC power supply 21 is in the positive cycle, the switching element 22Y of the bi-directional supply power-convening circuit 22 is turned on and off in response to the PWM control signal 88 outputted from the terminal O of the control IC 96, while the switching element 22U is maintained on. Thus, a circuit including the bi-directional supply power-converting circuit 22, the reactor 23, and the smoothing capacitor 24 forms the step-down converter which maintains the charged voltage of the smoothing capacitor 24 constant regardless of the amount of power generated by the motor 28 during deceleration of the rotor 27. The current regenerated in the AC power supply 21 thus becomes similar to a power-supply voltage, which is almost no harmonic component. In the operation mode IV, the bi-directional supply power-converting circuit 22 provides a negative slip frequency f1 to brake the motor 28 under the same V/F control as in the operation mode II for elevating a voltage generated by the motor 28 during deceleration of the rotor 27.

Figure 14:
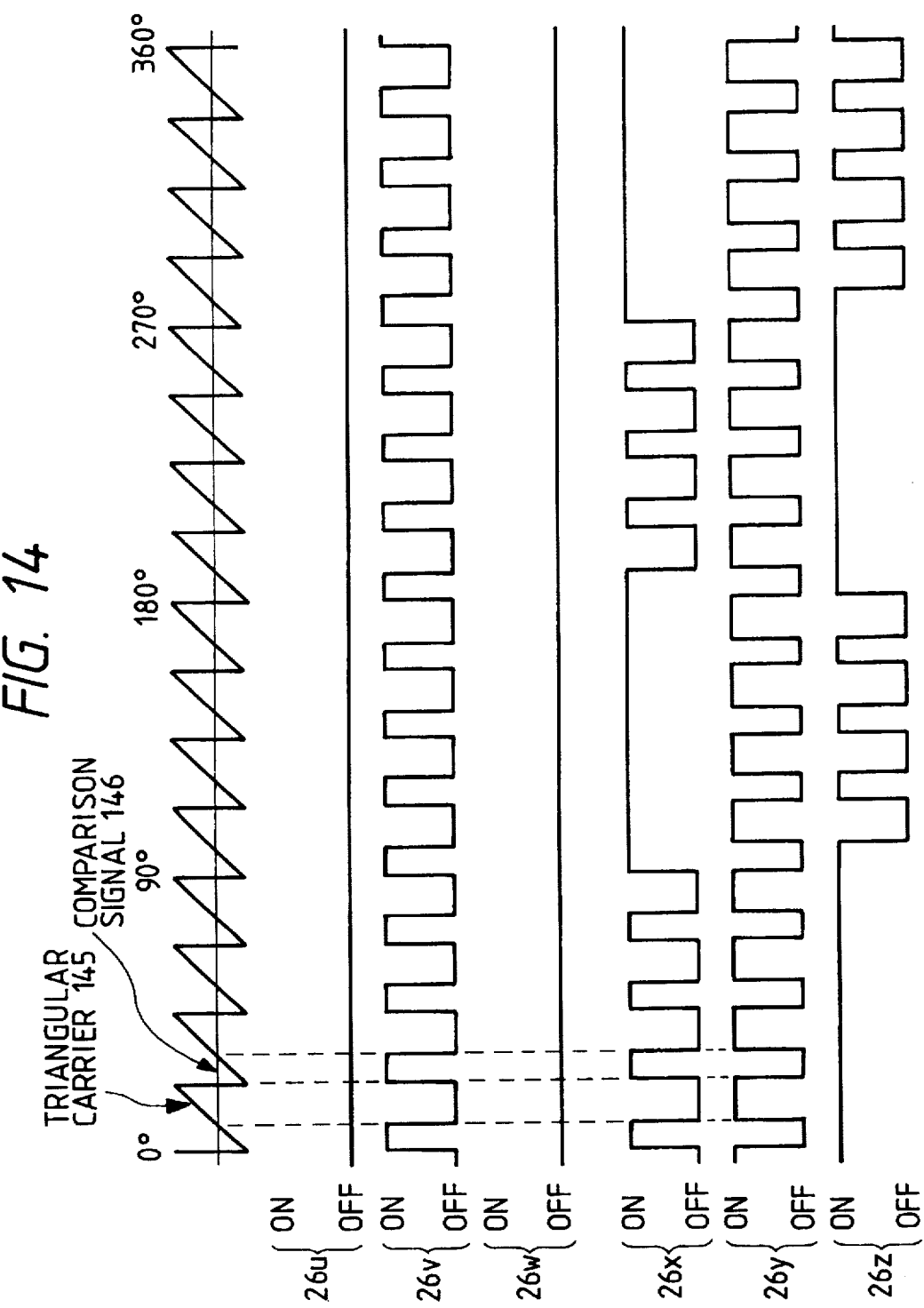
FIG. 14 is a time chart which shows a relation between a current waveform supplied to a motor and operations of switching elements of a bi-directional supply power-converting circuit.

In an operation mode V shown in FIG. 5, the motor 28 is controlled to decrease the speed of the rotor 27 slowly to zero. Since the motor 28 must be controlled at lower speeds in the operation mode V, a direct-current brake is applied on the motor 28 in stead of an alternating-current brake for decreasing the speed thereof smoothly. Therefore, in the operation mode V, the bi-directional supply power-converting circuit 22 may perform the forward operation to serve as the step-up converter, or alternatively turns off all the switching elements 22U, 22V, 22X, and 22Y for serving as a simple full-wave rectifier if the power required for the direct-current brake is small (i.e., in a lower speed range of the motor). Further, the charged voltage of the smoothing capacitor 24 is modified by the AC phase control element 25 to provide a wide range of brake control to the motor 28 under the PWM control and the direct-current brake control. FIG. 14 shows on-off operation patterns for the switching elements 26u, 26v, 26w, 26x, 26y, and 26z of the bi-directional motor power-converting circuit 26. A desired PWM duty factor may be selected by changing a correspondence between a triangular carrier wave 145 and a comparison signal 146 for controlling a braking force applied to the motor 28. The blocks BPWM0 to BPWM31 stored in the ROM 29, as shown in FIG. 11, are used to provide 32 different duty factors for the direct-current brake. Note that FIG. 14 shows an example wherein the number of cycles of the triangular carrier wave 145 is sixteen and the duty factor is 40%.

Figure 15:
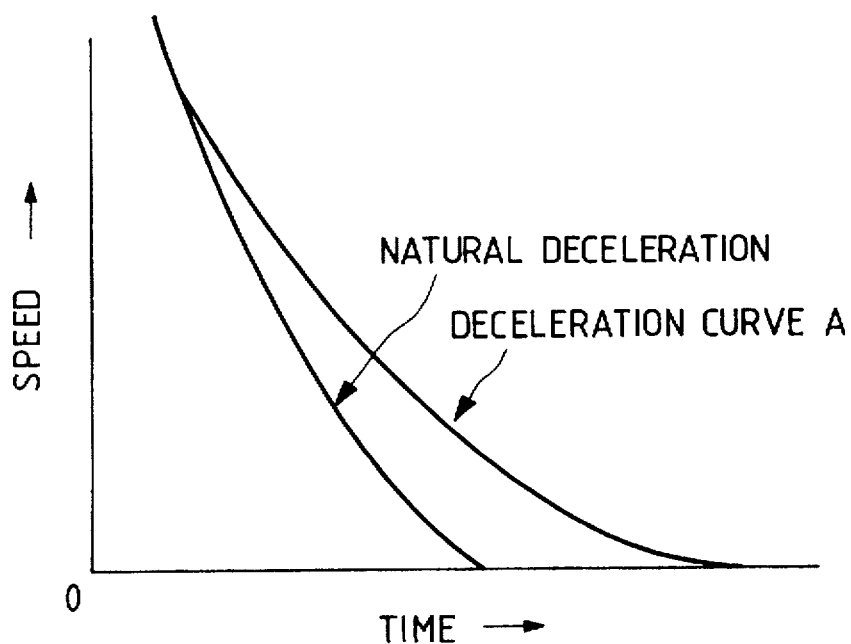
FIG. 15 is a graph which shows the decrease in speed of a motor in a braking mode with respect to time.

In the operation mode V, the motor 28 may be decreased in speed slower than natural deceleration according to a deceleration curve A shown in FIG. 15 dependent upon the type of material disposed within a centrifuge and separating conditions thereof. This is achieved by regulating the charged voltage of the smoothing capacitor 22 through the AC phase control element 25 in the same manner as in the operation mode I to drive the motor 28 through the bi-directional motor power-converting circuit 26.

While in the above embodiment, the bi-directional supply power-converting circuit 22 is connected to a single-phase alternating power supply, it may be connected to a three-phase alternating power supply. This is realized by arranging two additional switching elements in the circuit 22, and further providing the V-sensor 40, the I-sensor 41, and the reactor 23 for each phase. Additionally, the AC phase control element 25 may be arranged at a place designated at numeral 132 in FIG. 1, and may be provided with a transistor or a GTO element having self-arc-extinguishing function. Further, the bi-directional supply power-converting circuit 22 and the bi-directional motor power-converting circuit 26 may be formed by using part of functions of switching elements of a known converter, and may be provided with GTO elements.

Figure 16:
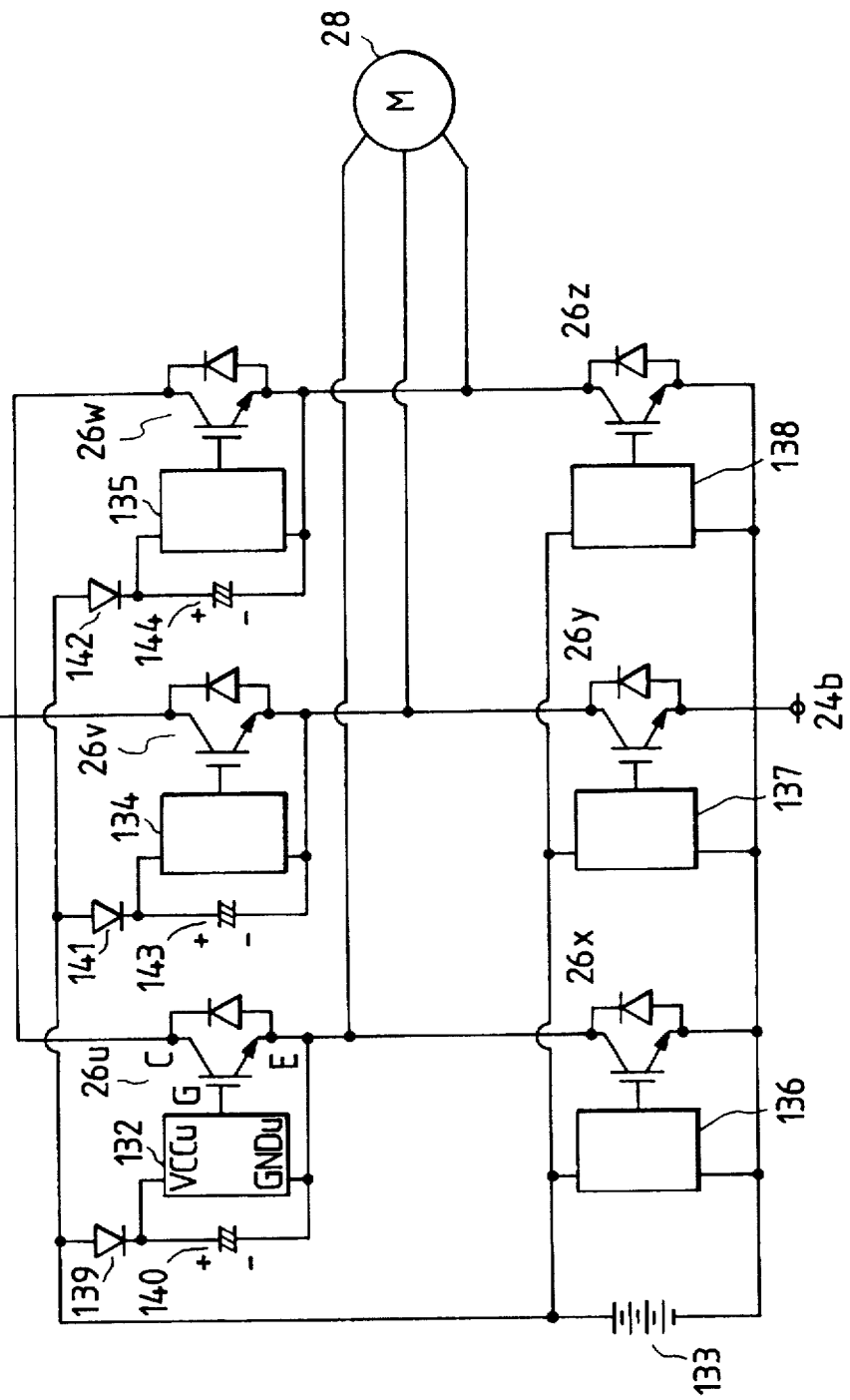
FIG. 16 is a circuit diagram which shows drive circuits for switching elements of a bi-directional motor power-converting circuit.
Figure 17:
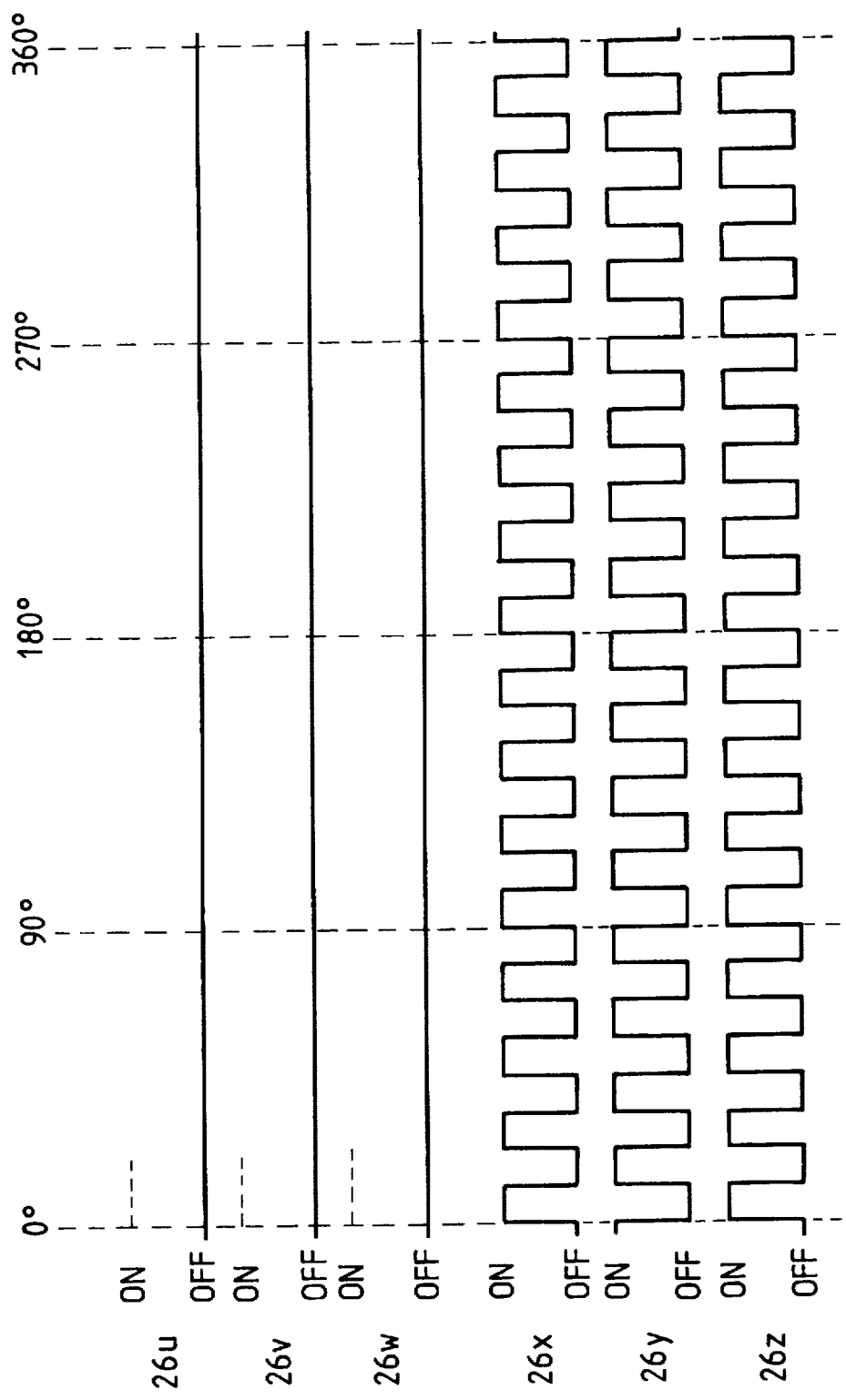
FIG. 17 is a time chart which shows on-off operations of switching elements of a bi-directional motor power-converting circuit at the time of switching operations of the capacitors shown in FIG. 12.

Referring to FIG. 16, there is shown a modification of the circuit arrangement of the power control system, which is designed to utilize a common power supply for energizing the switching elements 22U, 22V, 22X, and 22Y of the bi-directional supply power-converting circuit 22 and the switching elements 26u, 26v, 26w, 26x, 26y, and 26z of the bi-directional motor power-converting circuit 26. Note that FIG. 16 shows as an example a circuit arrangement only for the bi-directional motor power-converting circuit 26 for the sake of brevity of illustration. The same reference number as employed in FIGS. 1 and 8 refer to the same parts, and explanation thereof in detail will be omitted here.

Explaining as an example the drive circuit 132 of the switching element 26u, a common power supply 133 is connected to a cathode line 24b of the smoothing capacitor 24 at a reference voltage, and supplies power to the drive circuits 132, 134, 135, 136, 137, and 138. A reverse-blocking diode 139 and an aluminum foil electrolytic capacitor 140 are connected in series. The capacitor 140 is connected at the other end to the emitter E of the switching element 26u, and serves to store drive electrical energy for the drive circuit 132. A power supply terminal VCCu and a grounding terminal GNDU are connected to both ends of the capacitor 140 in parallel.

In operation, when the switching element 26x is turned on, the capacitor 140 is charged in a circuit line extending from the common power supply 133 to the switching element 26x through the diode 139 and the capacitor 140. When the switching element 26x is turned off, a cathode of the capacitor 140 is placed in a floating condition, so that drive electrical energy for the drive circuit 132 of the switching element 26u operable in a complementary relation to the switching element 26x, is stored in the capacitor 140. The same is true for the switching elements 26y, 26v, 26z, and 26w.

As apparent from the above discussion, the drive circuits 132, 134, and 135 are activated by electrical energy stored in the capacitors 140, 143, and 144, respectively. This requires turning on and off the switching elements 26x, 26y, and 26z arranged on a lower arm at all times. The on-off operation patterns for the direct-current brake shown in FIG. 14 are so defined as to meet the above switching operational requirements. The same is true for the bi-directional supply power-converting circuit 22.

In the frequency control to provide a slippage to the motor 28, the frequency of the pulse signal 73 may vary due to a time constant of the low-pass filter 81 in a transition period during which the capacitors C1 to C5 connected to the PLL element 69 of the PLL pulse generator 31 are switched, thereby resulting in a lack of dead time provided for avoiding the arm short-circuit caused in on-off operations of, for example, the switching element 26x on the lower arm arranged opposite the switching element 26u on the upper arm of the bi-directional motor power-converting circuit 26. For avoiding this drawback, the switching elements 26u, 26v, and 26w on the upper arm are all turned off, while the switching elements 26x, 26y, and 26z on the lower arm are turned on and off repeatedly to activate the bi-directional motor power-converting circuit 26 temporally for about 200 msec. from the time just before one of the capacitors C1 to C5 is switched to another, required for the frequency of the pulse signal 73 to be stable. These switching operation patterns are stirred in the block ARMPAT 150 of the ROM 29 shown in FIG. 11. This eliminates the need for separate power supplies for the drive circuits of the switching elements on the upper arm. The same is true for the bi-directional supply power-converting circuit 22.

Figure 18:
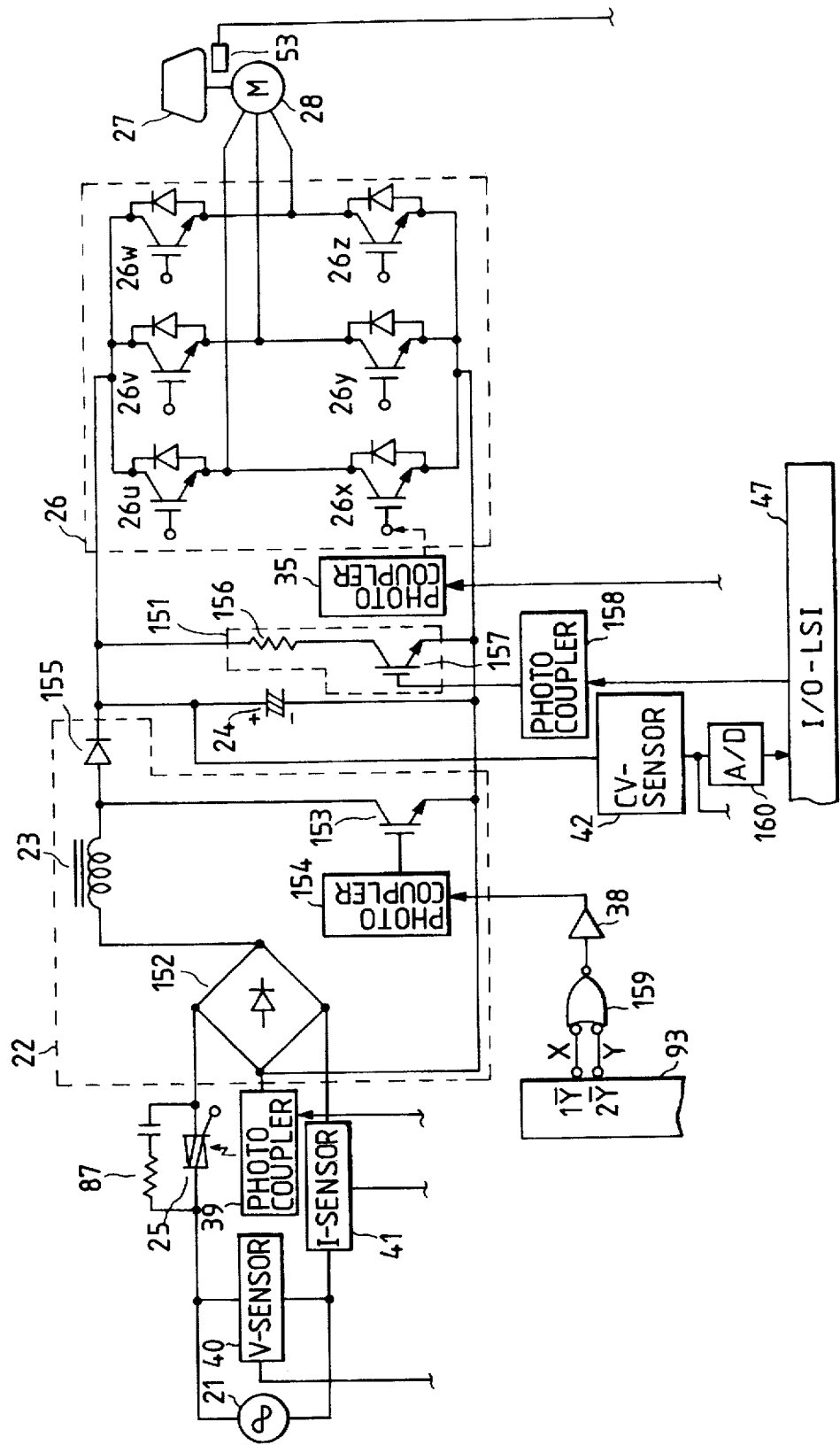
FIG. 18 is a block diagram which shows a power control system according to a second embodiment of the invention.

Referring to FIG. 18, there is shown a power control system according to a second embodiment of the invention. The same reference numbers as employed in FIGS. 1 and 2 refer to the same parts, and explanation thereof in detail will be omitted here.

The second embodiment features a circuit structure of the bi-directional supply power-converting circuit 22 and a discharge unit 151 designed to discharge electrical energy stored in the smoothing capacitor 24 during the regenerating operation of the motor 28.

The bi-directional supply power-converting circuit 22 includes a rectifier bridge 152, a step-up switching element 153 such as a FET or an IGBT, and a photo coupler 154 controlling on-off operations of the switching element 153, and a diode 155. The discharge unit 151 includes a discharge resistor 156 and a switching element 157 similar to the switching element 153.

In operation, the bi-directional supply power-converting circuit 22 operates to decrease harmonic components of an incoming current from the AC power supply 21, but does not have a function to return the electrical energy stored in the smoothing capacitor 24 back to the AC power supply 21, so that the electrical energy of the smoothing capacitor 24 is discharged through the discharge unit 151. The photo coupler 154 is activated by a signal derived by performing the OR operation through the OR gate 159 on the signals provided from the data selector 93 to the switching elements 22X and 22Y of the bi-directional supply power-converting circuit 22 to turn on and off the switching element 153 regardless of positive and negative cycles of the AC power supply 21.

The photo coupler 158 controlling on-off operations of the switching element 157 of the discharge unit 151 is activated by the I/O-LSI 47. The CPU 55 takes in through the A/D converter 160 and the I/O-LSI 47 a sensor signal indicative of a charged voltage of the smoothing capacitor 24 outputted form the CV-sensor 42, and turns on the switching element 157 when the sensor signal exceeds a given voltage level to discharge the electrical energy of the smoothing capacitor 24 through the resistor 156.

Figure 19:
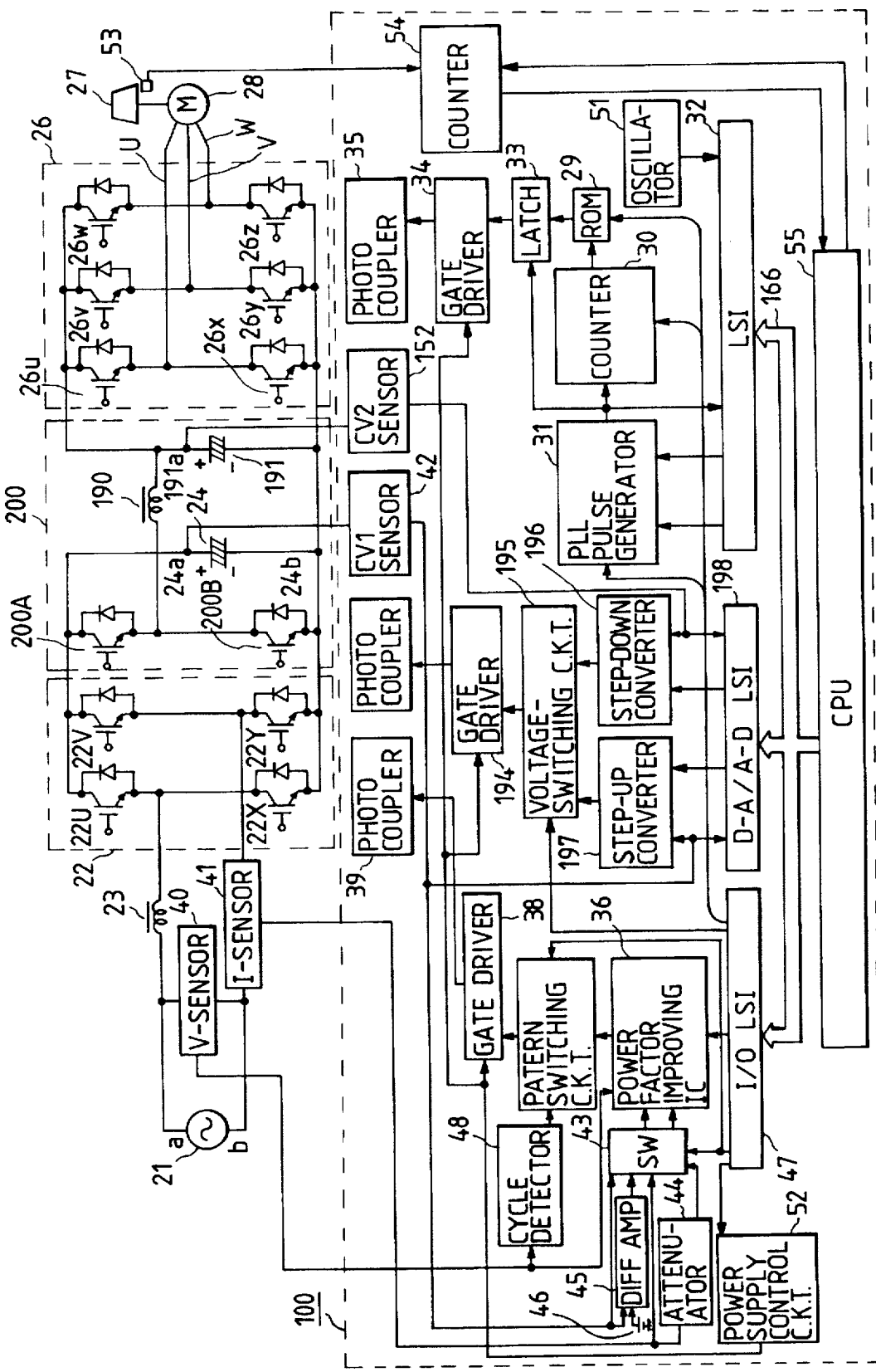
FIG. 19 is a block diagram which shows a power control system according to a third embodiment of the invention.

Referring to FIG. 19, there is shown a power control system according to a third embodiment of the invention. The same reference numbers as employed in the above embodiments refer to the same parts, and explanation thereof in detail will be omitted here.

The power control system of the third embodiment further includes a direct current power-converting circuit 200. The control unit 100 further includes a first CV-sensor 42, a second CV-sensor 192, a photo coupler 193, a gate driver 194, a voltage switching circuit 195, a step-down converter 196, a step-up converter 197, a D-A/A-D LSI 198 having D-A and A-D converter functions.

The direct current power-converting circuit 200 serves to change voltages of direct currents flowing in opposite directions between smoothing capacitors 24 and 191, and includes switching elements 200A and 200B similar to those of the bi-directional supply power-convening circuit 22 and a coke coil 190. The switching elements 200A and 200B are arranged in series across the smoothing capacitor 24 through an anode line 24a and a cathode line 24b. The coke coil 190 is arranged between a line connecting between the switching elements 200A and 200B and an anode line 191a of the smoothing capacitor 191.

The first CV-sensor 42 detects a charged voltage of the smoothing capacitor 24 to provide a signal indicative thereof to the power factor-improving IC 36 through the differential amplifier 45 and the analog switch 43. The second CV-sensor 192 detects a charged voltage of the smoothing capacitor 191 to provide a signal indicative thereof to the step-down converter 196.

The step-up converter 197 controls on-off operations of the switching element 200B. The step-down converter 196 controls on-off operations of the switching element 200A. Sensor signals from the first and second CV-sensors 42 and 192 are inputted to the step-up converter 197 and the step-down converter 196 as direct current control feedback signals, respectively, and also inputted to the D-A/A-D LSI 198. The D-A/A-D LSI 198 provides direct current control reference signals to the step-up converter 197 and the step-down converter 196. The CPU 55 performs the step-up control for the smoothing capacitor 24 and the step-down control for the smoothing capacitor 191. The step-up converter 197 and the step-down converter 196 provide pulse-width control outputs to the voltage switching circuit 195 to select the step-up operation or the step-down operation. The voltage switching circuit 195 then outputs a control signal to the gate driver 194 for selectively turning on and off either of the switching elements 200A and 200B through the photo coupler 193. When it is required to decrease the voltage of the smoothing capacitor 24 to charge the smoothing capacitor 191, the switching element 200A is activated, while when it is required to increase the voltage of the smoothing capacitor 191 to charge the smoothing capacitor 24, the switching element 200A is activated.

In the operation mode I shown in FIG. 5, the motor 28 is, as already mentioned in the above first embodiment, controlled so as to increase the speed of the rotor 27 slowly. The direct current power-converting circuit 200 serves as a step-down converter which transfers electrical energy stored in the smoothing capacitor 24 charged by the AC power supply to the smoothing capacitor 191 to increase a charged voltage thereof according to an increase in speed of the motor 28, thereby modifying the voltage applied to the motor 28 properly under the PWM control of the motor inverter (i.e., the bi-directional motor power-converting circuit 26).

An operation of the direct current power-converting circuit 200 will be discussed below.

Figure 20:
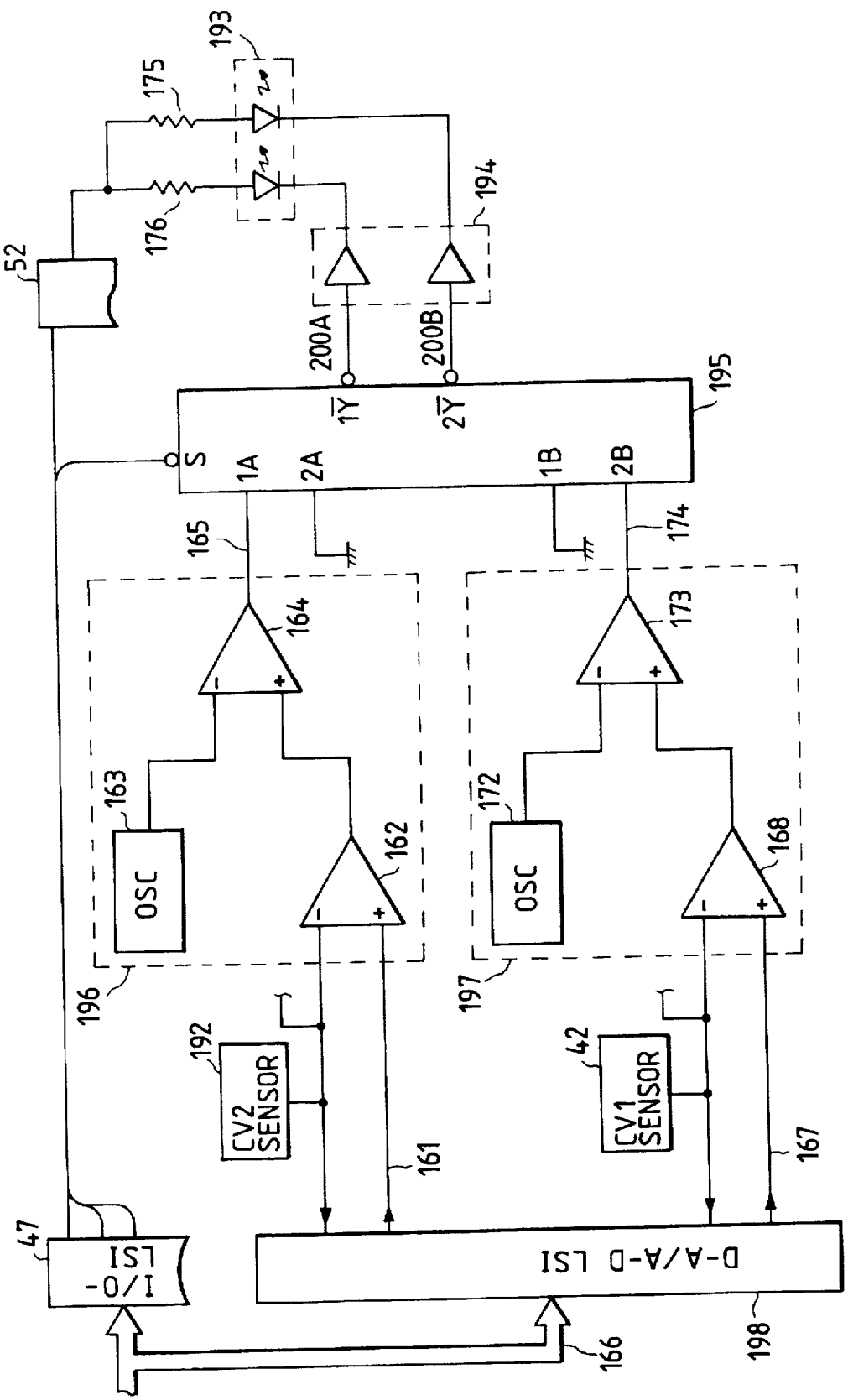
FIG. 20 is a block diagram which shows a dc power-converting circuit.

The step-down converter 196, as shown in FIG. 20, uses a known DC-DC converter IC such as a HA17524 device manufactured by Hitachi Co., Ltd. in Japan. The step-down converter 196 includes an error amplifier 162, an oscillator 163, and a comparator 164. The error amplifier 162 differentially amplifies a sensor signal or feedback signal from the second CV-sensor 192 and a charged voltage setting signal 161 from the D-A/A-D LSI 198 to provide a signal to the comparator 164. The comparator 164 then compares the signal from the error amplifier 162 with a signal having a serrate waveform outputted from the oscillator 163 to provide an on-off control signal 165 to an input terminal 1A of the voltage switching circuit 195 made of a data selector such as a 74HC158 device for controlling an on-off operation of the switching element 200A of the direct current power-converting circuit 200. Thus, the step-down converter 196 is responsive to instructions issued by the CPU 55 through a control line 166 including an address data control signal line extending from the CPU 55 to the I/O-LSI 47, the D-A/A-D LSI198, and the timer LSI 32 to control a charged voltage of the smoothing capacitor 191 based on the charged voltage setting signal 161. Increasing the voltage of the charged voltage setting signal 161 causes the charged voltage of the smoothing capacitor 191 to be increased. The electrical energy stored in the smoothing capacitor 24 charged at a constant voltage in the forward operation of the bi-directional supply power-converting circuit 22 is thus transferred to the smoothing capacitor 191 so that the bi-directional motor power-converting circuit 26 serves as the motor inverter which consumes the electrical energy stored in the smoothing capacitor 191 to drive the motor 28 for increasing the speed of the rotor 27 at a given slow rate.

Similarly, the step-up converter 197 includes an error amplifier 168, an oscillator 172, and a comparator 173. The error amplifier 168 differentially amplifies a sensor signal or feedback signal from the first CV-sensor 42 and a charged voltage setting signal 167 from the D-A/A-D LSI 198 to provide a signal to the comparator 173. The comparator 173 then compares the signal from the error amplifier 168 with a signal having a serrate waveform outputted from the oscillator 172 to provide an on-off control signal 174 to an input terminal 2A of the voltage switching circuit 195 for controlling an on-off operation of the switching element 200B of the direct current power-converting circuit 200 to control the charged voltage of the smoothing capacitor 24. Increasing the voltage of the charged voltage setting signal 167 causes the charged voltage of the smoothing capacitor 24 to be increased. Therefore, even when the charged voltage of the smoothing capacitor 191 is increased only to a lower voltage by dc power regenerated by the motor 28 in a low-speed range during a regenerating braking operation, as will be described hereinafter, in which the bi-directional motor power-converting circuit 26 decreases the speed of the motor 28 during the backward operation of the bi-directional supply power-converting circuit 22, the step-up operation of the direct current power-converting circuit 200 charges the smoothing capacitor 24 to a desired high level so that the regenerated power is returned back to the AC power supply through the bi-directional supply power-converting circuit 22.

The analog signals provided by the first and second CV-sensors 42 and 192 are, as mentioned above, also inputted to the D-A/A-D LSI 198 for permitting the CPU 55 to monitor voltage levels of the smoothing capacitors 24 and 191. The I/O-LSI 47 controls a logic signal level at a terminal S of the voltage switching circuit 195 to select operational patterns, as shown in FIG. 21, for activating the switching elements 200A and 200B of the direct current power-converting circuit 200. Specifically, when a logic low level signal (i.e., logic 0) appears at the terminal S, input signals to the terminal 1A and 2A are logically reversed and outputted from the terminal 1Y and 2Y so that the switching element 200A is turned on and off in response to the on-off control signal 165 under the PWM control, while the switching element 200B is maintained turned off for establishing a step-down converter mode. Alternatively, when a logic high level signal (i.e., logic 1) appears at the terminal S, input signals to the terminal 1B and 2B are logically reversed and outputted from the terminal 1Y and 2Y so that the switching element 200B is turned on and off in response to the on-off control signal 174 under the PWM control, while the switching element 200A is held turned off for establishing a step-up converter mode. The reference numbers 175 and 176 designate resistors for restricting the current supplied to the photo coupler 193.

In order to match an actual speed of the motor 28 with a target speed of the rotor 27 shown in FIG. 5, the CPU 55 performs a PID operation based on a difference between the target speed of the rotor and the actual speed of the motor 28 to determine a step-down voltage of the direct current power-converting circuit 200, a slip frequency provided by the PLL pulse generator 31, and a duty factor for the PWM control by the bi-directional motor power-converting circuit 26 for executing the V/F control under the known feedback control.

In the operation mode II, the direct current power-converting circuit 200 serves as the step-down converter to charge the smoothing capacitor 191 at substantially the same level as a charged voltage of the smoothing capacitor 24. Thus, the V/F control for, the motor 28 is accomplished by stepwise changing the amplitudes of the sine-wave signals 65 shown in FIG. 7 or duty factors of voltages applied to the motor 28 in the same manner as described in the above first embodiment. Note that the voltage control (V-control) of the V/F control may be effected, in stead of the PWM control based on the data stored in the ROM 29, by using a voltage-regulating function of the direct current power-converting circuit 200 for regulating an output voltage of the step-down converter 197 to control a charged voltage of the smoothing capacitor 191. Other operations are identical with those of the first embodiment.

In the operation mode III, the direct current power-converting circuit 200, similar to the operation mode II, serves as the step-down converter to charge the smoothing capacitor 191 at substantially the same level as a charged voltage of the smoothing capacitor 24. Other operations are identical with those of the first embodiment.

Figure 22:
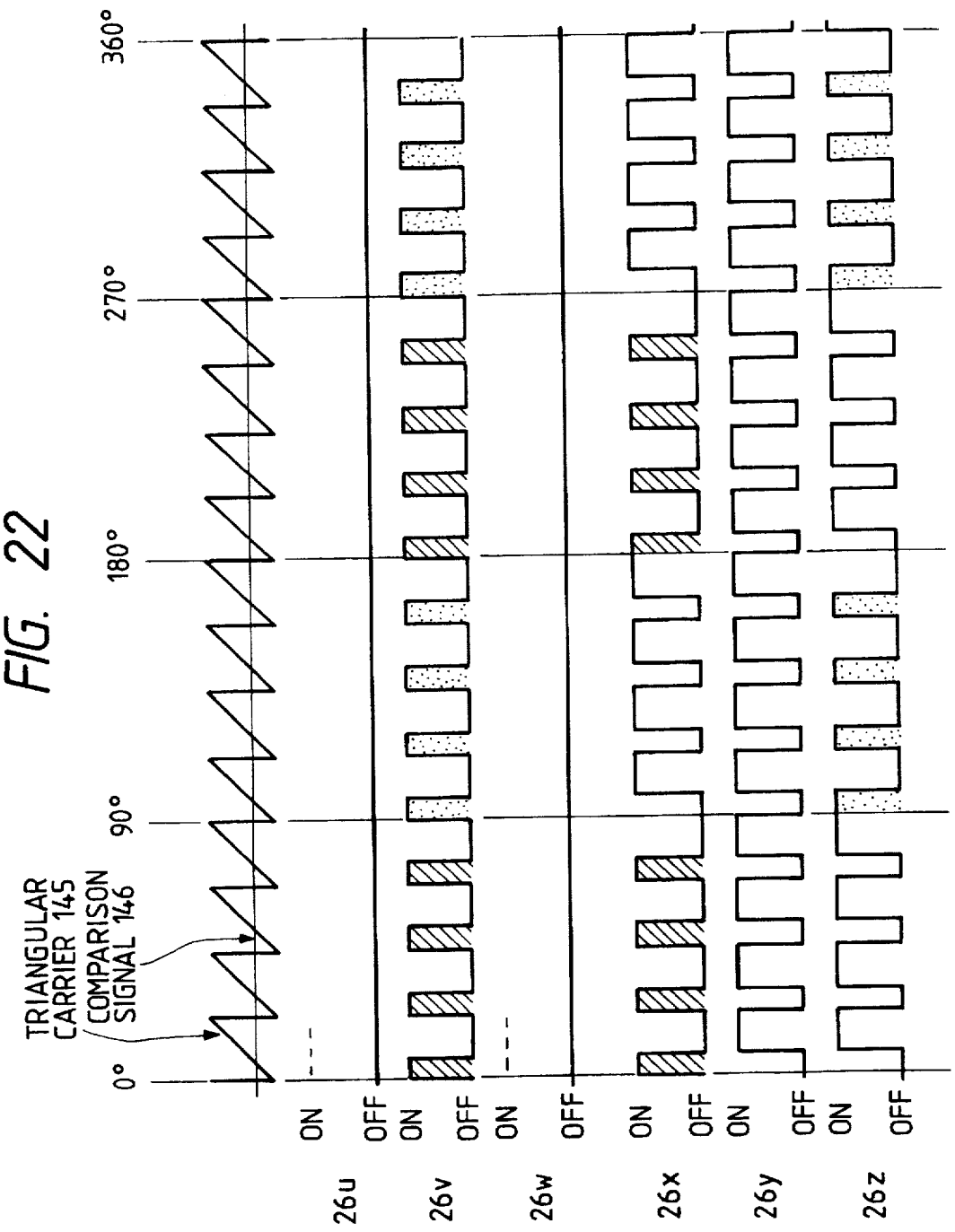
FIG. 22 is a time chart which shows a relation between a current waveform supplied to a motor and operations of switching elements of a dc power-converting circuit.
Figure 23:
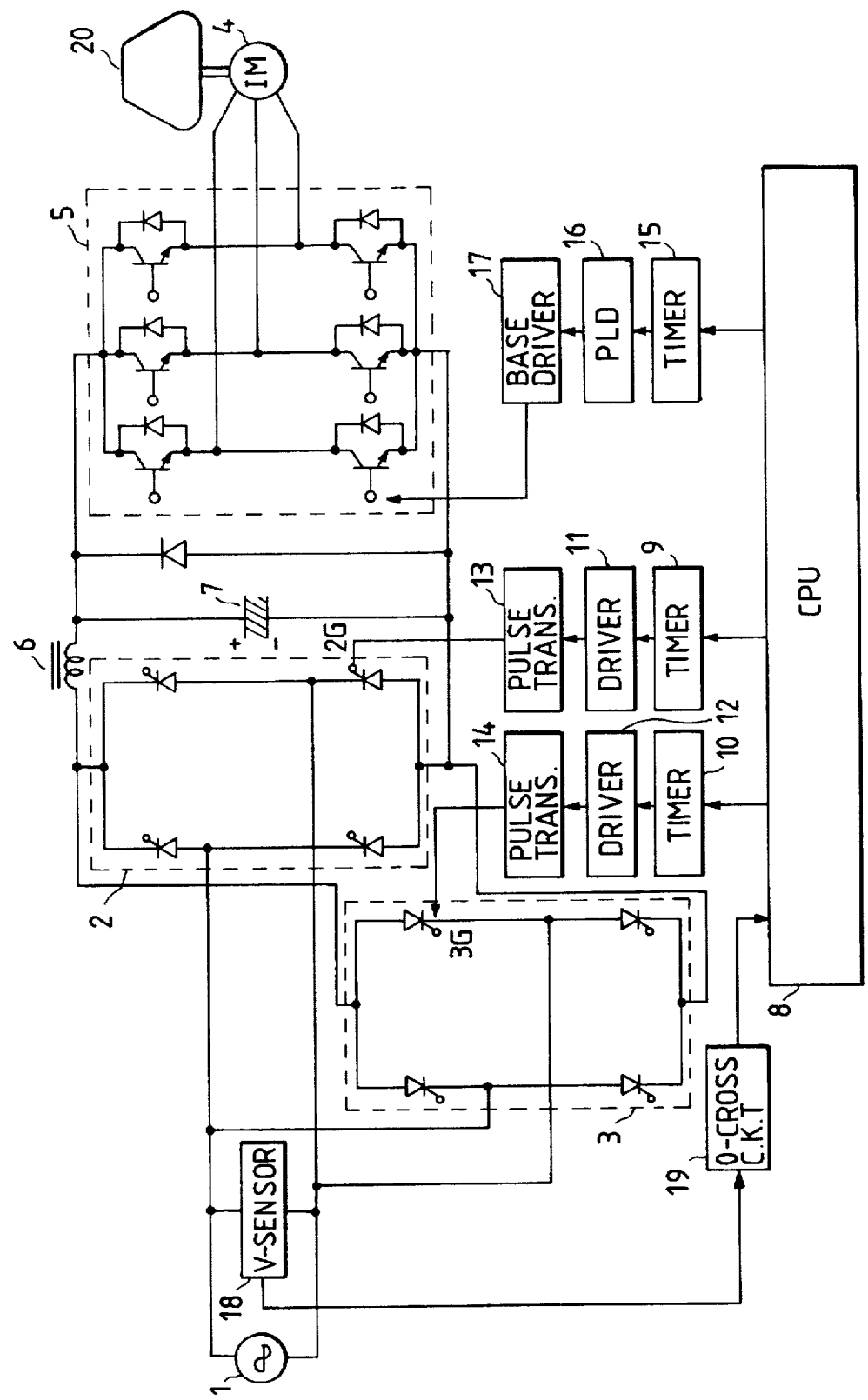
FIG. 23 is a circuit diagram which shows a conventional power control system for a motor of a centrifuge.

In the operation modes IV and V, the direct current power-converting circuit 200 serves as the step-up converter which, as referred to in the explanation of the operation mode I, increases dc power stored in the smoothing capacitor 191 to charge the smoothing capacitor 24. Other operations are identical with those of the first embodiment. Note that as an alternative to the operational patterns, as shown in FIG. 14, of the switching elements 26u to 26z of the bi-directional motor power-converting circuit 26 in the operation mode V, one shown in FIG. 22 may be utilized. FIG. 22 shows an example wherein the number of cycles over 360° of the triangular carrier wave 145 is sixteen and a duty factor is 40%. For example, between 0° and 90°, the switching elements 26v and 26x are turned on synchronously, while the switching elements 26y and 26z are turned on synchronously to apply a braking force to the motor 28.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A power control apparatus for controlling power supplied to a motor employed in a centrifugal machine comprising:

an AC power supply providing the power to the motor;

a smoothing capacitor;

a voltage sensor detecting a voltage of said power supply to provide a voltage signal indicative thereof;

a current sensor detecting a current of said power supply to provide a current signal indicative thereof;

a charged voltage sensor detecting a charged voltage of said smoothing capacitor to provide a charged voltage signal indicative thereof;

a bi-directional supply power-converting unit including rectifying elements connected to form a circular rectifying circuit and switching elements each connected to one of the rectifying elements in parallel, said bi-directional supply power-converting unit being connected at an ac terminal to said AC power supply and at a dc terminal to said smoothing capacitor for charging said smoothing capacitor;

a bi-directional motor power-converting unit including rectifying elements connected to form a circular rectifying circuit and switching elements each connected to one of the rectifying elements in parallel, said bi-directional motor power-converting unit being connected at an ac terminal to the motor and at a dc terminal to said smoothing capacitor;

a reactor disposed between the AC power supply and said bi-directional supply power-converting unit; and a control unit including an on-off switching circuit, said control unit controlling, in a motor power mode, the switching elements of said bi-directional motor power-converting unit with given operational timing to supply power to the motor and also controlling the on-off switching circuit to turn on and off the switching elements of said bi-directional supply power-converting unit with given on-off timing selected based on the voltage signal, the current signal, and the charged voltage signal provided by said voltage sensor, said current sensor, and said charged voltage sensor to have said bi-directional supply power-converting unit function as a step-up converter to charge said capacitor, in a motor braking mode wherein said bi-directional motor power-converting unit charges said smoothing capacitor with power of the motor regenerated during a braking operation, said control unit controlling the on-off switching circuit to turn on and off the switching elements of said bi-directional supply power-converting unit with given on-off timing selected based on the voltage signal, the current signal, and the charged voltage signal provided by said voltage sensor, said current sensor, and said charged voltage sensor to have said bi-directional supply power-converting unit function as a step-down converter to restrict the charged voltage of said capacitor from being increased above a preselected level for returning the power regenerated by the motor back to the AC power supply.

2. A power control apparatus as set forth in claim 1, wherein in the motor braking mode, said control unit controls the switching elements of said bi-directional motor power-converting unit to provide a braking force to the motor.

3. A power control apparatus for controlling power supplied to a motor employed in a centrifugal machine comprising:

a first smoothing capacitor;

a second smoothing capacitor;

a bi-directional supply power-converting unit including rectifying elements connected to form a circular rectifying circuit and switching elements each connected to one of the rectifying elements in parallel, said bi-directional supply power-converting unit being connected at an ac terminal to an AC power supply and at a dc terminal to said first smoothing capacitor for charging said first smoothing capacitor;

a bi-directional motor power-converting unit including rectifying elements connected to form a circular rectifying circuit and switching elements each connected to one of the rectifying elements in parallel, said bi-directional motor power-converting unit being connected at an ac terminal to the motor and at a dc terminal to said second smoothing capacitor;

a dc power-converting unit disposed between said bi-directional supply power-converting unit and said bi-directional motor power-converting unit; and a control unit controlling, in a motor power mode, the switching elements of said bi-directional motor power-converting unit with given operational timing to supply power to the motor, and also controlling said dc power-converting unit to function as a step-down converter acting on the first smoothing capacitor for charging said second capacitor at a preselected level, in a motor braking mode wherein said bi-directional motor power-converting unit charges said second smoothing capacitor with power of the motor regenerated during a braking operation, said control unit controlling the switching elements of said bi-directional supply power-converting unit with given operational timing for returning the power regenerated by the motor back to said AC power supply, and also controlling said dc power-converting unit to function as a step-up converter acting on the second smoothing capacitor for allowing said first capacitor to be charged at a given level.

4. A power control apparatus as set forth in claim 3, further comprising a reactor disposed between the AC power supply and said bi-directional supply power-converting unit.

* * * * *